Figure 1:
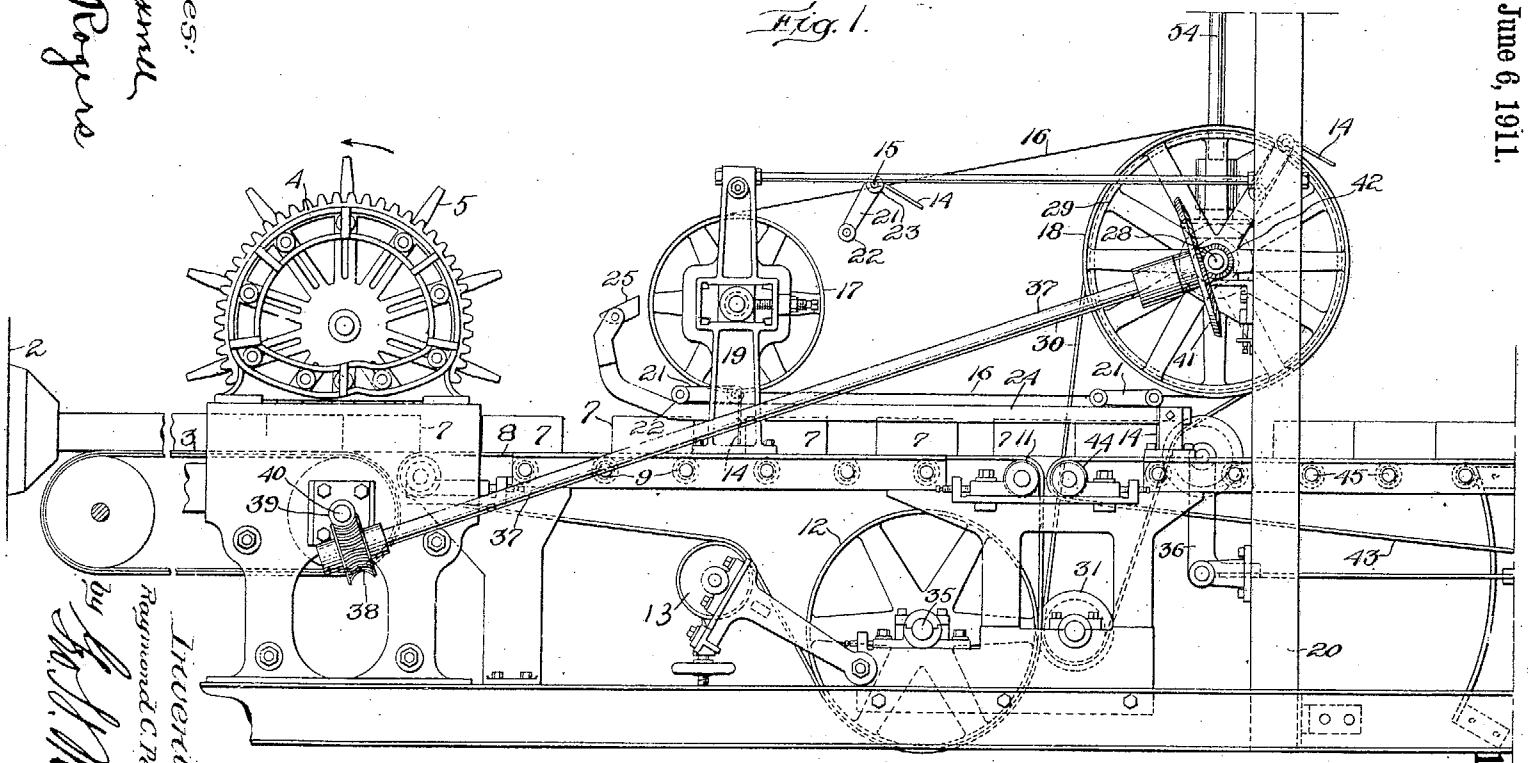

R. C. PENFIELD.

SYSTEM AND APPARATUS FOR HACKING BRICKS.

APPLICATION FILED MAR. 28, 1911. 14 SHEETS—SHEET 1.

Reissued June 6, 1911. 13,256.

Witnesses:
C. A. Maxwell
C. L. Rogers

Inventor:
Raymond C. Penfield,
by Geo. S. Maxwell,
Atty.

R. C. PENFIELD.

SYSTEM AND APPARATUS FOR HACKING BRICKS.

APPLICATION FILED MAR. 28, 1911.

14 SHEETS—SHEET 2.

Reissued June 6, 1911.

13,256.

Witnesses:

C. A. Maxwell

C. L. Rogers

Inventor:

Raymond C. Penfield, by Geo. H. Maxwell Atty.

R. C. PENFIELD.

SYSTEM AND APPARATUS FOR HACKING BRICKS.

APPLICATION FILED MAR. 28, 1911.

Reissued June 6, 1911.

14 SHEETS—SHEET 3

13,256.

Witnesses:
C. A. Maxwell
C. L. Rogers

Inventor:
Raymond C. Penfield,
by Geo. H. Maxwell, Atty.

R. C. PENFIELD.

SYSTEM AND APPARATUS FOR HACKING BRICKS.

APPLICATION FILED MAR. 28, 1911.

Reissued June 6, 1911.

14 SHEETS—SHEET 4.

13,256.

Witnesses:
A. A. Maxwell
C. L. Rogers

Inventor:
Raymond C. Penfield,
by Geo. H. Maxwell, Atty.

R. C. PENFIELD.

SYSTEM AND APPARATUS FOR HACKING BRICKS

APPLICATION FILED MAR. 28, 1911.

Reissued June 6, 1911. 13,256. 14 SHEETS—SHEET 5.

Witnesses:
C. A. Maxwell
C. L. Rogers

Inventor.
Raymond C. Penfield,
by Geo. S. Maxwell
atty.

R. C. PENFIELD.
SYSTEM AND APPARATUS FOR HACKING BRICKS.
APPLICATION FILED MAR. 28, 1911.
Reissued June 6, 1911.
14 SHEETS—SHEET 6.
13,256.
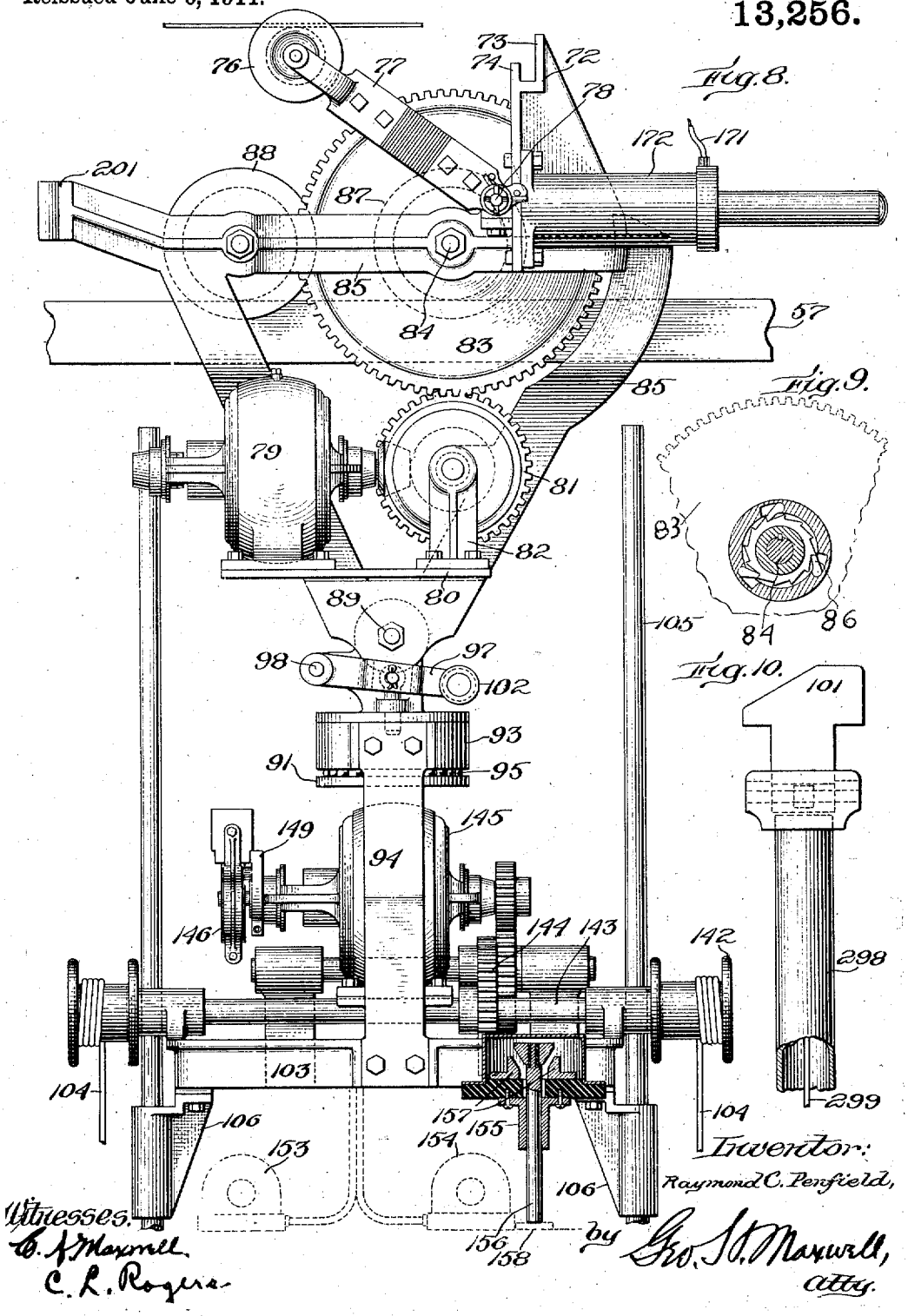

R. C. PENFIELD.
SYSTEM AND APPARATUS FOR HACKING BRICKS.
APPLICATION FILED MAR. 28, 1911.
14 SHEETS—SHEET 7.
Reissued June 6, 1911.
13,256.
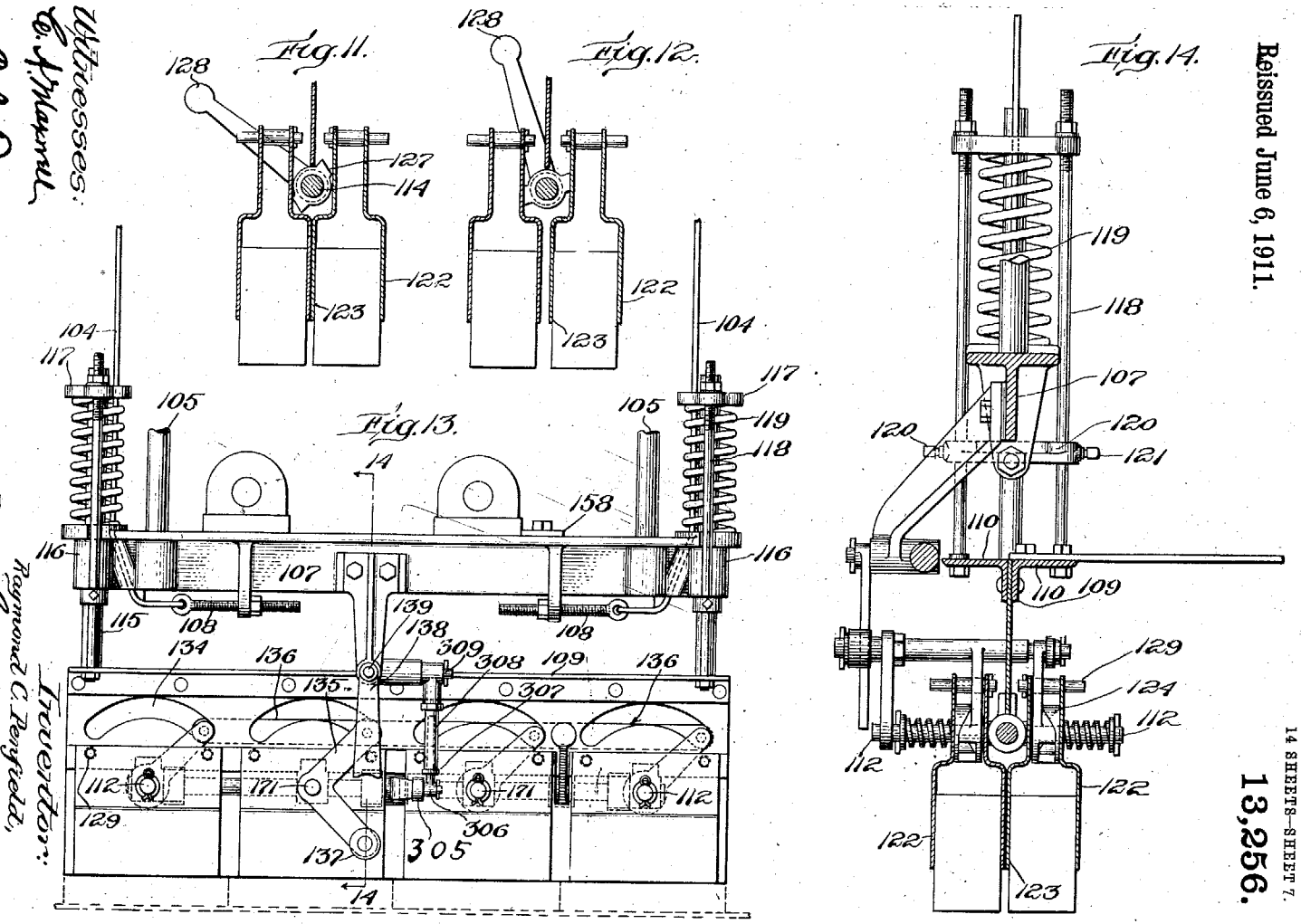
Witnesses:
C. A. Maxwell
C. L. Rogers
Inventor:
Raymond C. Penfield,
by Geo. S. Maxwell, Atty.

R. C. PENFIELD.
SYSTEM AND APPARATUS FOR HACKING BRICKS.
APPLICATION FILED MAR. 28, 1911.
14 SHEETS—SHEET 3.
Reissued June 6, 1911.
13,256.
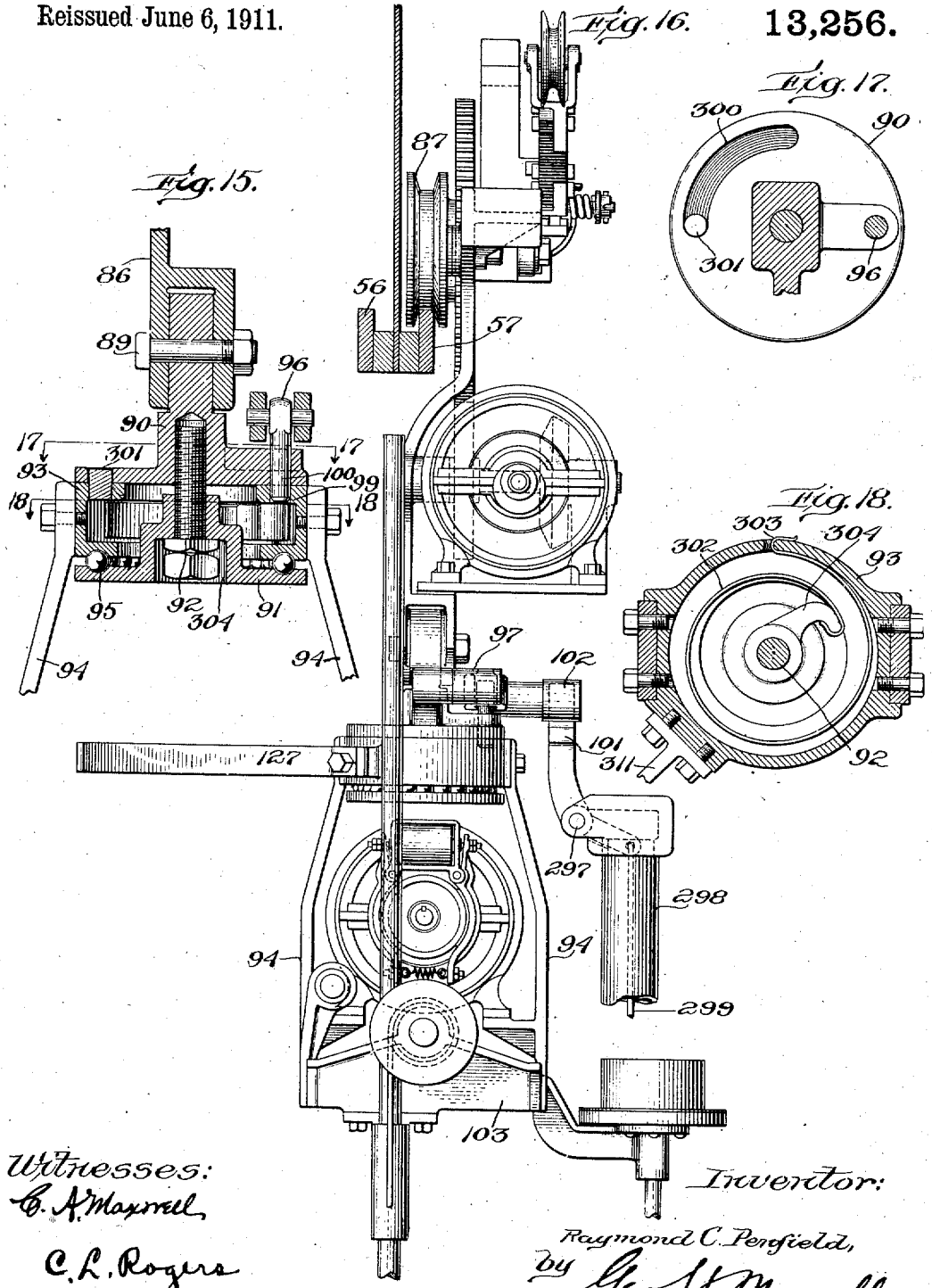
Witnesses:
C. A. Maxwell
C. L. Rogers
Inventor:
Raymond C. Penfield,
by Geo. H. Maxwell,
Atty.

R. C. PENFIELD.

SYSTEM AND APPARATUS FOR HACKING BRICKS.

APPLICATION FILED MAR. 28, 1911.

14 SHEETS—SHEET 9.

Reissued June 6, 1911.

13,256.

Witnesses:

C. A. Maxwell

C. L. Rogers

Inventor.

Raymond C. Penfield, by Geo. S. Maxwell Atty.

R. C. PENFIELD.

SYSTEM AND APPARATUS FOR HACKING BRICKS.

Reissued June 6, 1911. APPLICATION FILED MAR. 28, 1911. 14 SHEETS—SHEET 10.

13,256.

Witnesses:
Co. A. Maxwell
C. L. Rogers

Inventor:
Raymond C. Penfield,
by Geo. S. Maxwell,
Atty.

R. C. PENFIELD.

SYSTEM AND APPARATUS FOR HACKING BRICKS.

Reissued June 6, 1911. APPLICATION FILED MAR. 28, 1911.

14 SHEETS—SHEET 11.

13,256.

Witnesses:
C. A. Maxwell
C. L. Rogers

Inventor:
Raymond C. Penfield,
by Geo. S. Maxwell,
Atty.

R. C. PENFIELD.
SYSTEM AND APPARATUS FOR HACKING BRICKS.
APPLICATION FILED MAR. 28, 1911.
Reissued June 6, 1911.
14 SHEETS—SHEET 12
13,256.
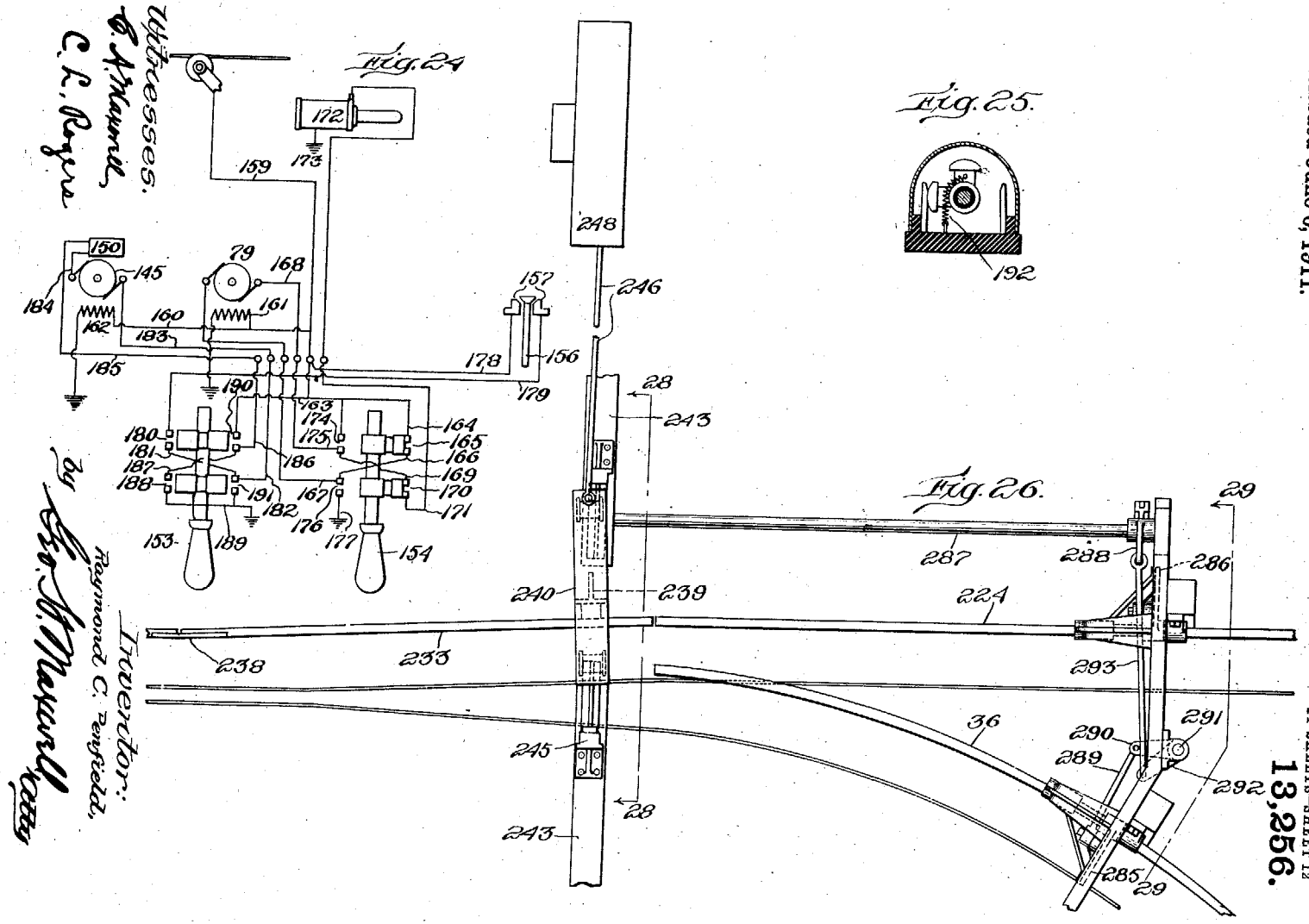

R. C. PENFIELD.

SYSTEM AND APPARATUS FOR HACKING BRICKS.

APPLICATION FILED MAR. 28, 1911.

14 SHEETS—SHEET 13.

Reissued June 6, 1911.

13,256.

Witnesses:

C. A. Maxwell

C. L. Rogers

Inventor.

Raymond C. Penfield, by Geo. S. Maxwell,

R. C. PENFIELD.

SYSTEM AND APPARATUS FOR HACKING BRICKS.

APPLICATION FILED MAR. 28, 1911.

14 SHEETS—SHEET 14.

Reissued June 6, 1911.

13,256.

Witnesses:
C. A. Maxwell
C. L. Rogers

Inventor.
Raymond C. Penfield,
by Geo. H. Maxwell, Atty.

UNITED STATES PATENT OFFICE.

RAYMOND C. PENFIELD, OF NEW YORK, N. Y.

SYSTEM AND APPARATUS FOR HACKING BRICKS.

13,256. Specification of Reissued Letters Patent. Reissued June 6, 1911.

Original No. 985,203, dated February 28, 1911. Serial No. 578,438. Application for reissue filed March 28, 1911. Serial No. 618,049.

*To all whom it may concern:*

Be it known that I, RAYMOND C. PENFIELD, a citizen of the United States, and resident of New York, in the county and State of New York, have invented an Improvement in Systems and Apparatus for Hacking Bricks, of which the following description, in connection with the accompanying drawings, is a specification, like letters on the drawings representing like parts.

The hacking of bricks, *i. e.* placing the molded bricks in proper spaced relation in stack formation for drying and burning, is usually a very laborious, tedious, and relatively expensive and somewhat destructive procedure, as it is accomplished largely by hand.

The present invention aims to accomplish automatically the proper hacking of the bricks and delivery thereof to the drying kiln or drier car continuously as the bricks are molded and cut.

In its preferred embodiment, the invention comprises a series of carriers or clamping means arranged to receive their loads of bricks while in motion, being for this purpose operated to travel at the loading region individually in unison with the cut bricks as the bricks are moved, preferably by belt, after being cut at the cut-off. These automatic carriers, moving in unison as stated, make it practicable to handle the bricks automatically from the continuously operating brick machine and cut-off.

A second feature of the invention resides in providing means for bunching together in units the bricks which have been previously separated at the cut-off, and by this bunching together is meant the bringing together again of a predetermined number of the separated bricks so that they are again in substantially the same relation as they were before being separated. The purpose of this feature of the invention is two-fold, first, to gain time for the proper handling of the bricks and the mechanical necessities of the process, and second, to insure the handling of the bricks in the desired units to the best advantage for hacking purposes. This bunching together of the bricks accomplishes a predetermined interruption in the otherwise continuous stream of bricks, without, however, interfering with the automatic and continuous handling and hacking of the bricks.

A third and equally important feature of the invention relates to a further utilization of the same principle of providing a time interval or means for gaining sufficient time for the accomplishment of certain necessarily slow portions of the work notwithstanding that the system is continuous, automatic, and rapid as a whole. This third feature resides in providing, in connection with the continuous series of carriers and coöperating mechanism which deliver the bricks to the carriers and enable the carriers to receive the bricks in a practically endless, on-moving stream limited only by the speed and capacity of the brick machine, means for automatically providing, in connection with each loaded carrier, sufficient time for the delivery of its load in proper hacked relation to previously delivered loads on a drier car or kiln car, this provision being preferably such that it may be denominated elastic. By this is meant that the preferred embodiment of the invention provides means capable of providing a short time interval or a longer time interval according to the necessities of any given plant or operator. In the preferred embodiment of the invention, this time interval is secured by providing, in connection with the main conveyers which deliver the bunched units or loads to the individual carriers, a system of runways containing a series of branches arranged in such order, and the whole provided with such automatic operating means, that each carrier is permitted to have a period of slow movement or actual stoppage when it arrives at the delivery point, during which its load is disposed of in the desired hacked relation to previous loads, as stated, before the carrier is obliged to proceed back on its circuit to take its place again in proper order relatively to the stream of bricks which the brick machine has continued to make notwithstanding the period of halting of the given carriage. These two time-interval provisions, viz. the periodicity or time-giving effect produced by the bunching operation, and the time-intervals for hacking permitted automatically by the branch runways, are essential to the most complete success, because they permit the automatic operation of the entire apparatus in accordance with the speed and capacity of the brick machine and the cut-off. Notwithstanding that the loading of the carriers and the unloading of the carriers (*i. e.* the actual hacking operation) each requires time and would apparently therefore require that the whole apparatus should halt therefor, the invention provides these time-intervals without requiring said halting.

While it is intended herein to cover each of the three features separately, as being capable of advantageous use in other connections, the invention as a whole is dependent upon them all together, and particularly upon the last two mentioned.

Figures 2, 3:
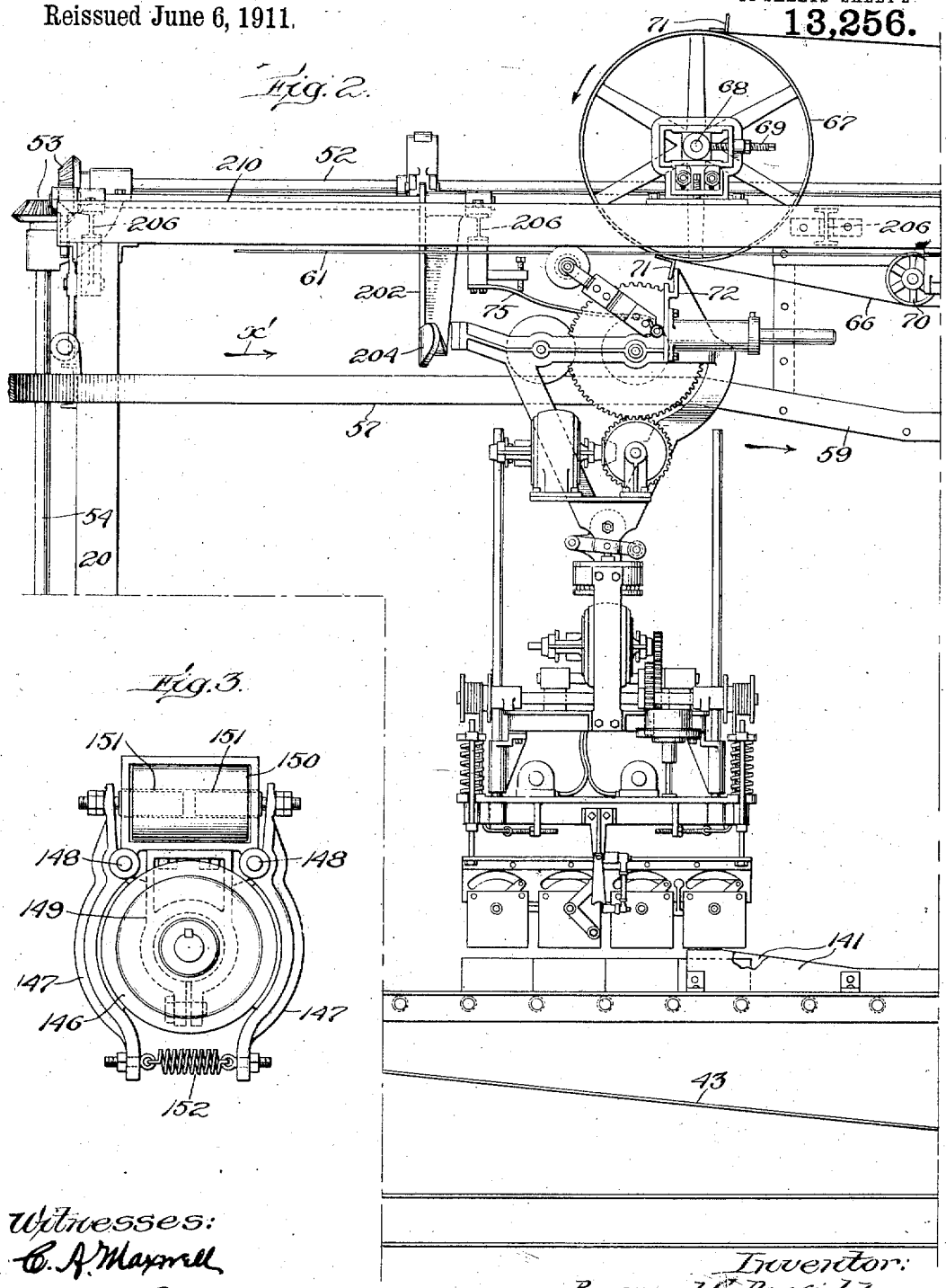
Figure 4:
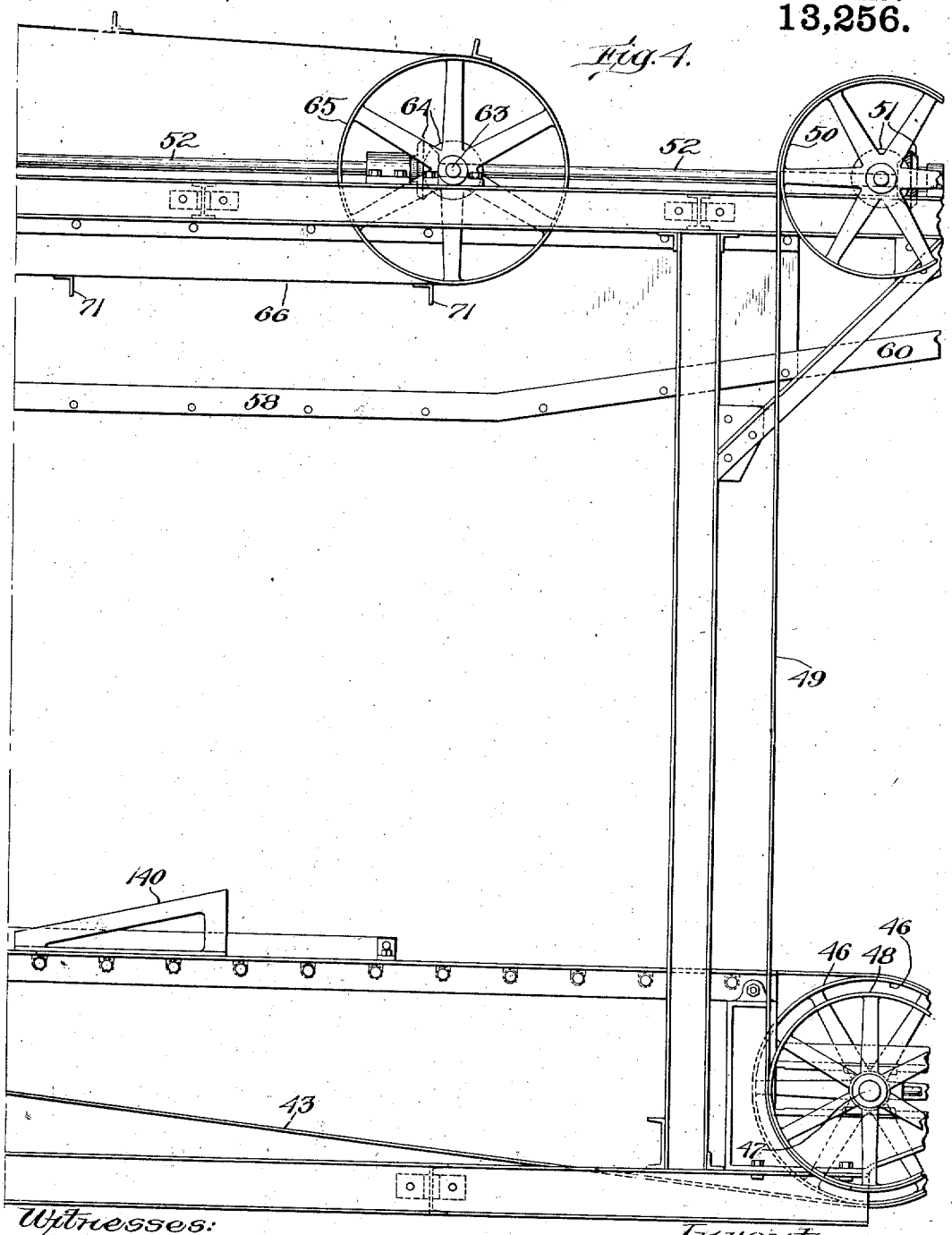
Figures 5, 6:
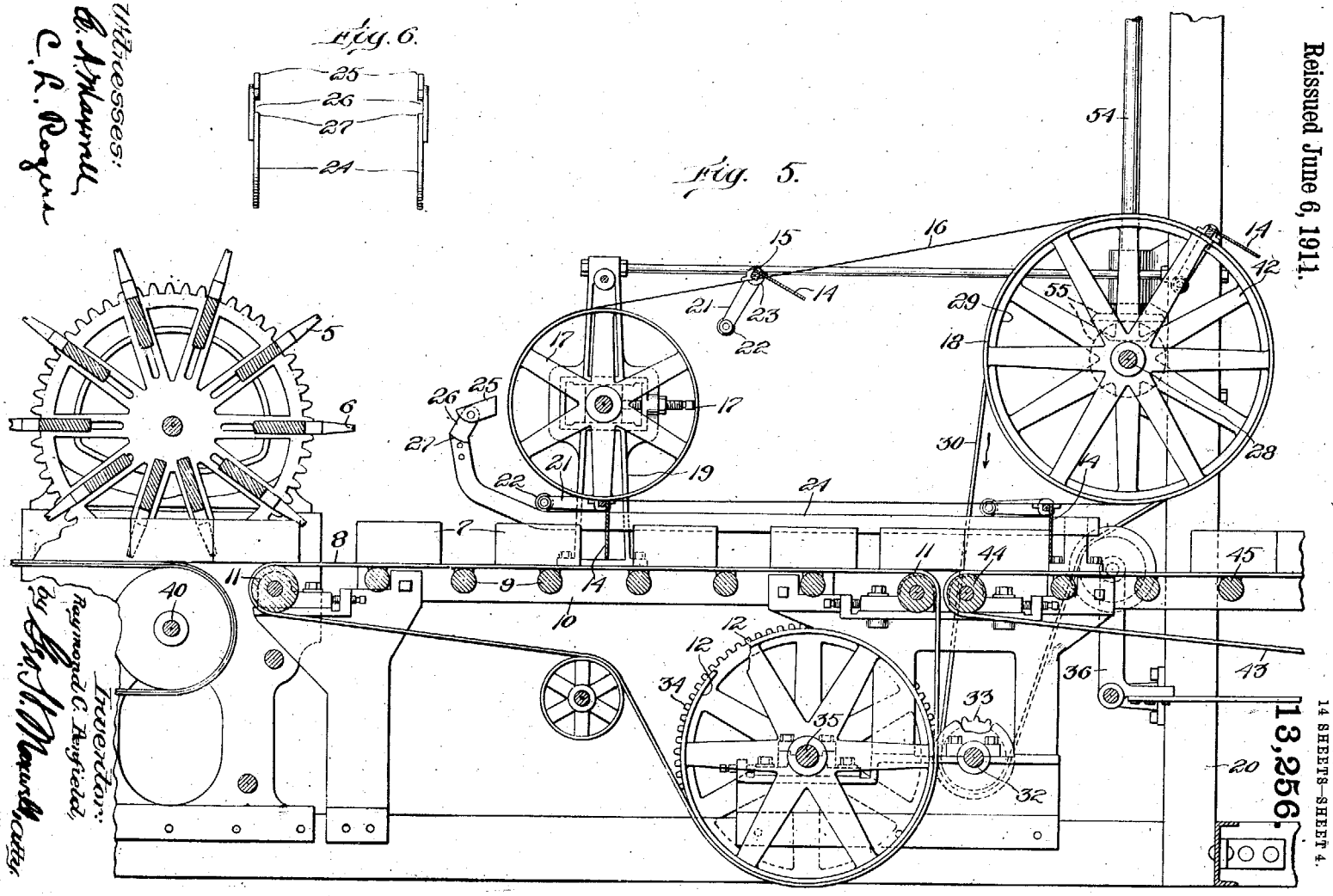
Figure 7:
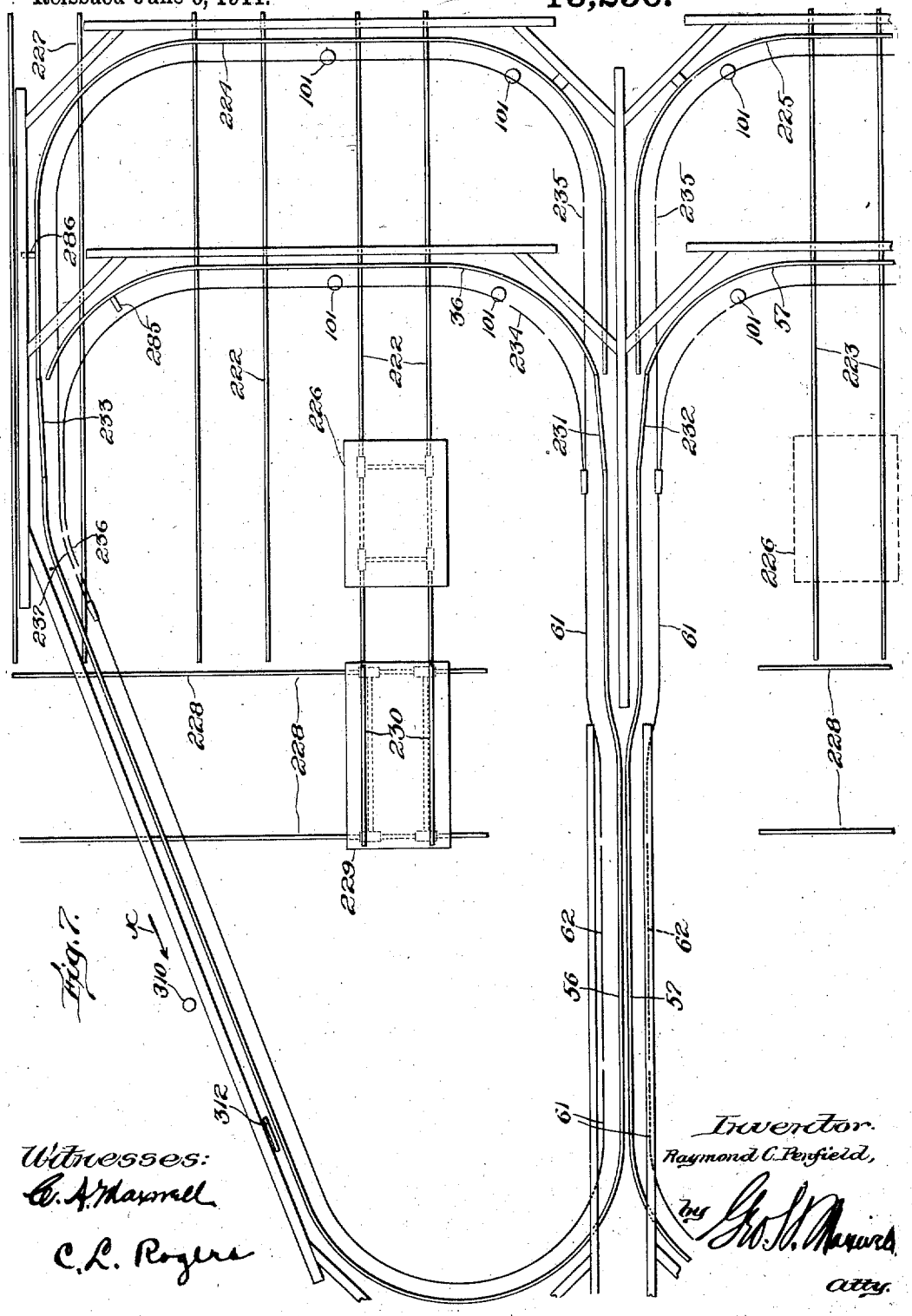
Figure 19:
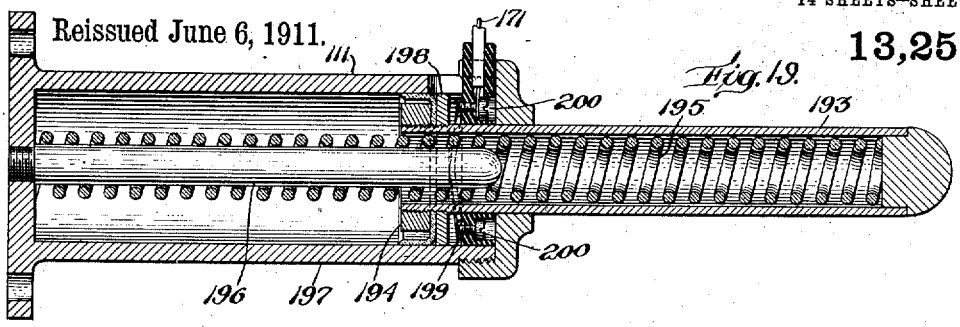
Figure 20:
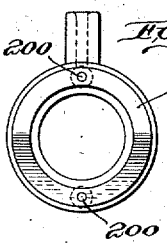
Figure 21:
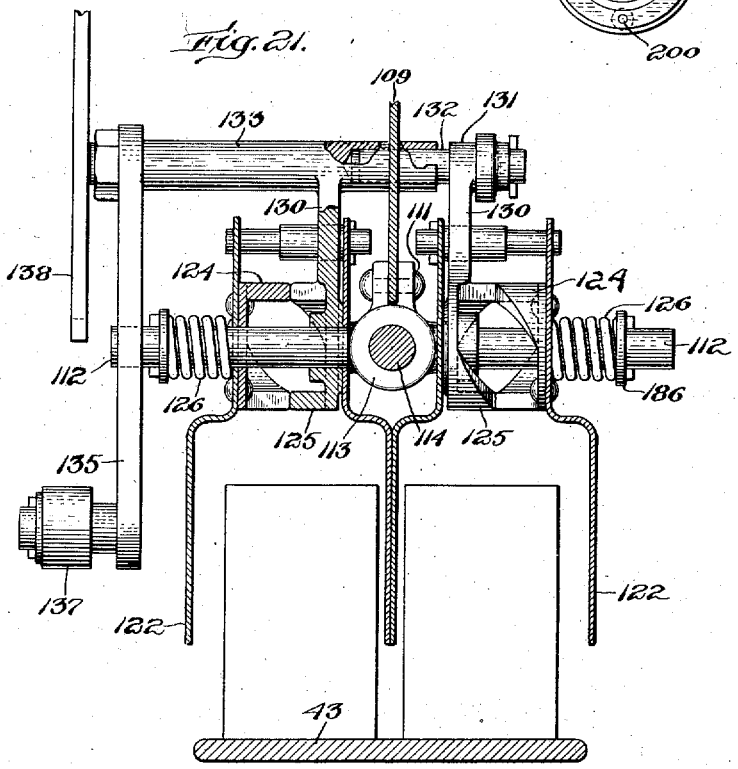
Figure 22:
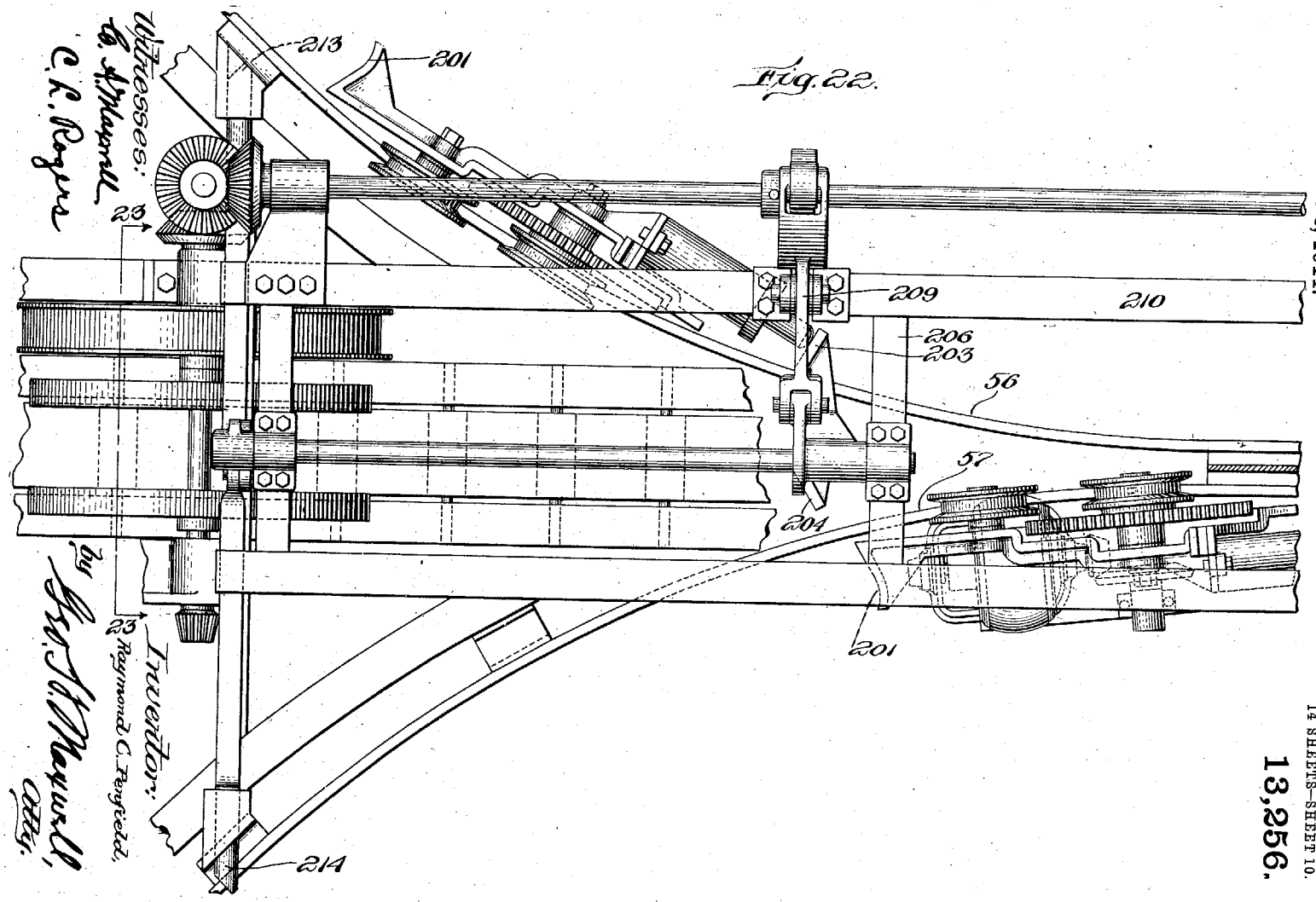
Figure 23:
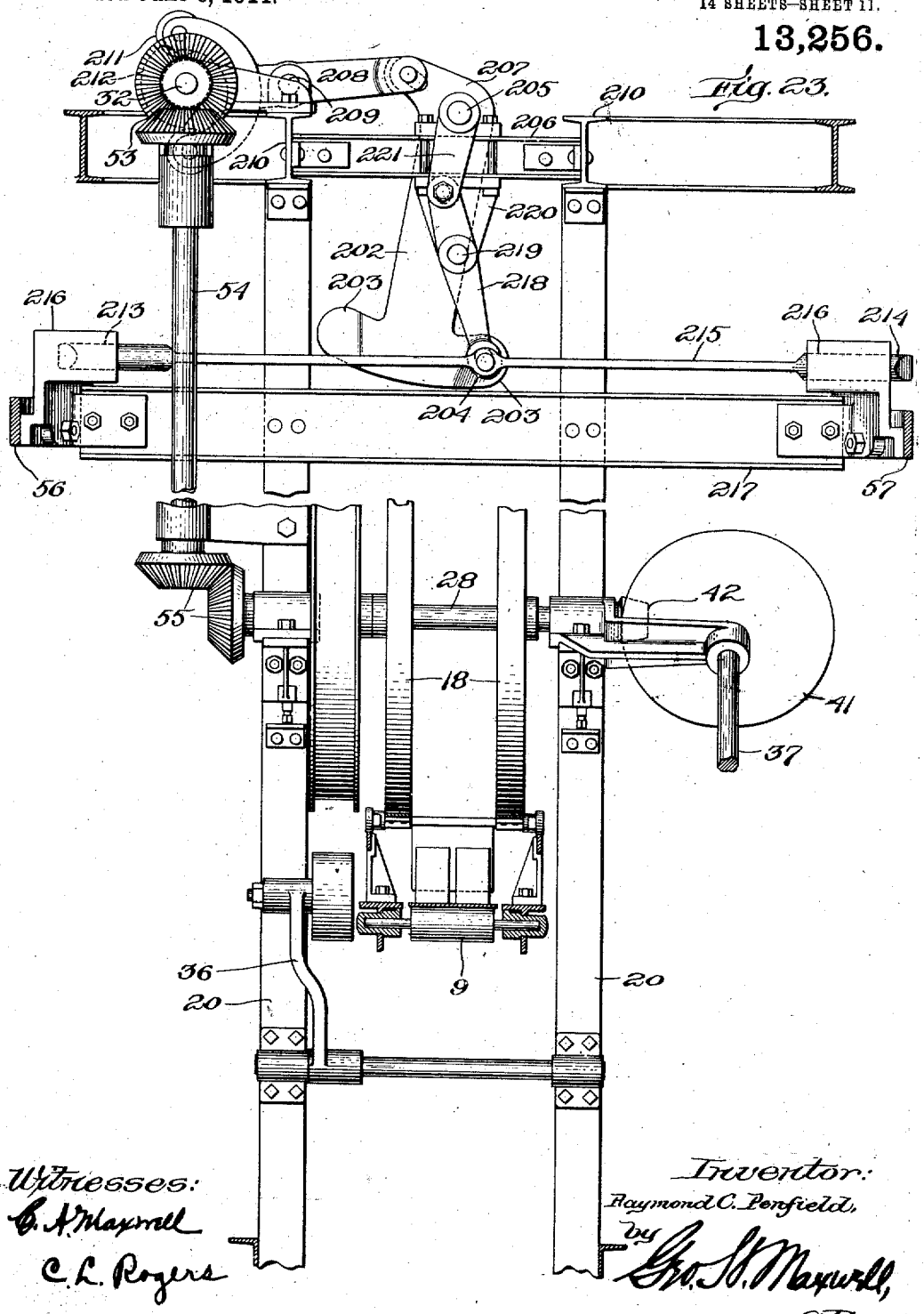
Figure 27:
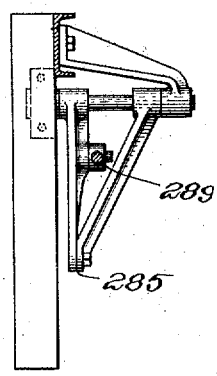
Figure 28:
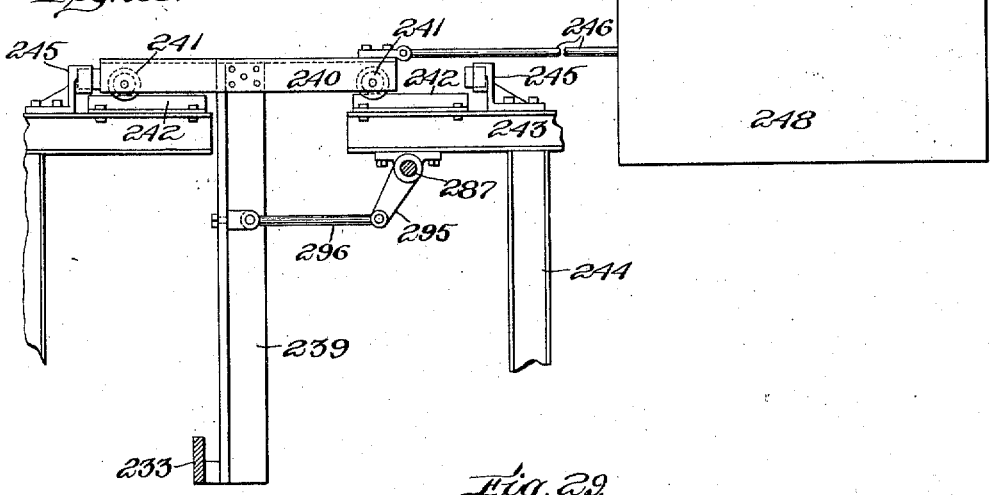
Figure 29:
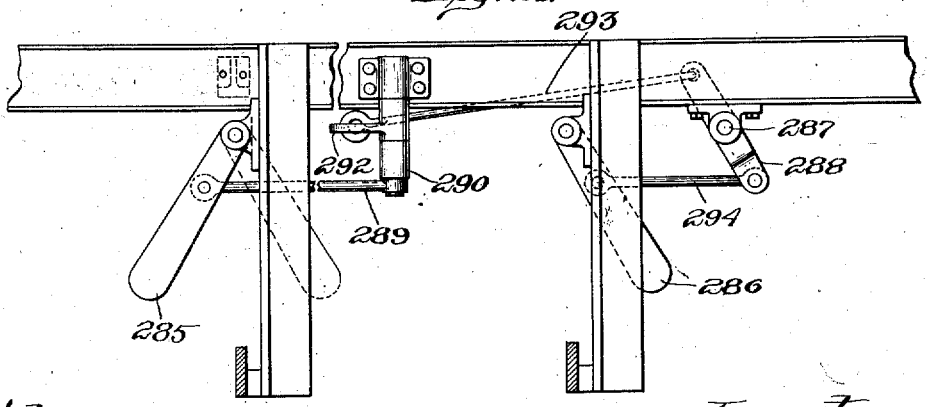
Figure 30:
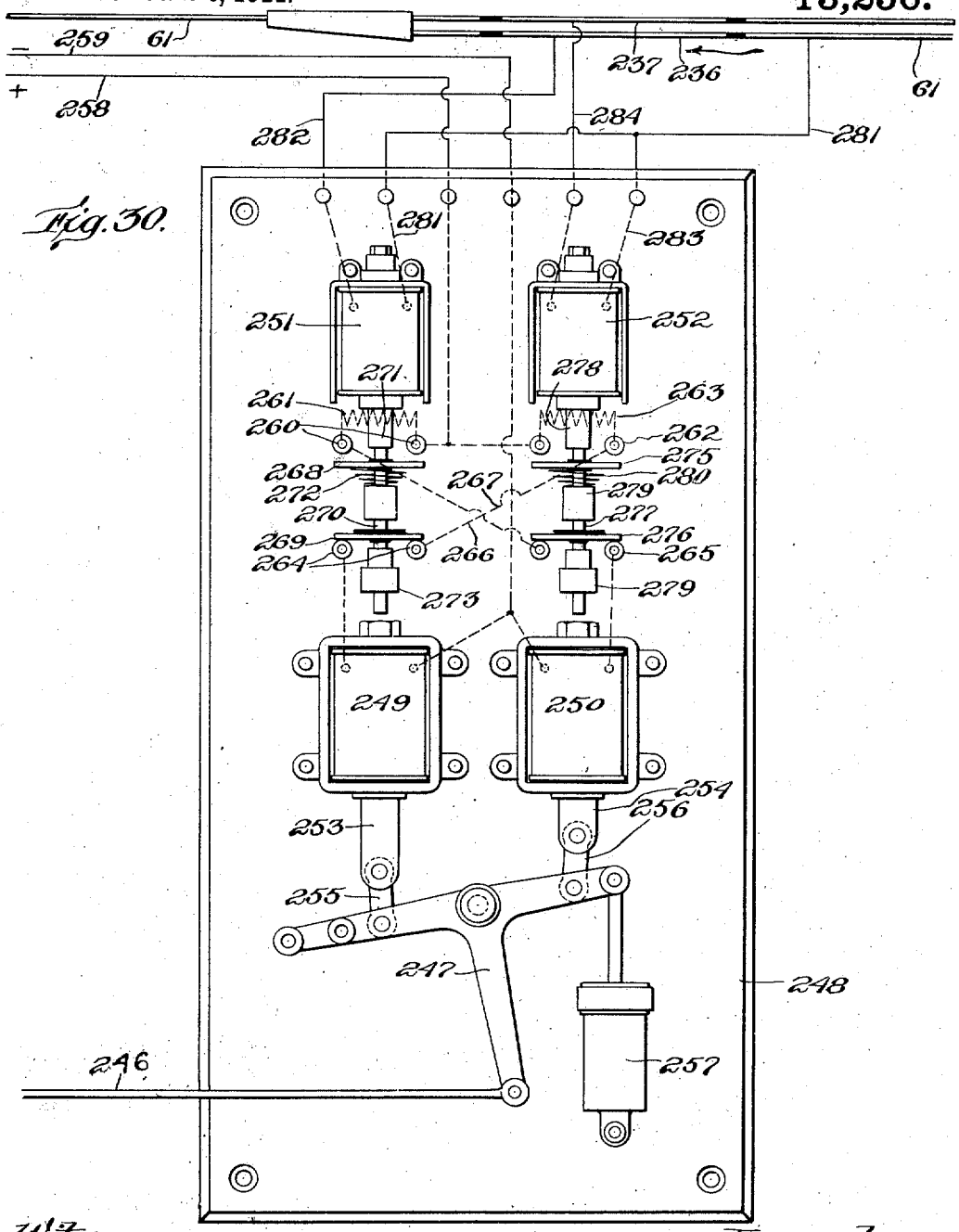

In the accompanying drawings, in which the entire apparatus and system are shown in their preferred embodiment, Figures 1, 2, and 4 show in three views a side elevation of the front end of the apparatus, where the bricks are made and loaded onto the carriers; Fig. 3 is a detail in front elevation of an automatic brake for the carrier-propelling mechanism; Fig. 5 is a view largely similar to Fig. 1, excepting that it is in longitudinal vertical section for showing further details; Fig. 6 is an end view of the tripping track or directing means for a portion of the bunching apparatus; Fig. 7 is a plan view showing the general arrangement and system constituting an important part of the invention; Fig. 8 is an enlarged fragmentary view in side elevation of the upper portion of the carrier and operating mechanism, parts being broken away and sectioned for clearness of illustration; Fig. 9 is a vertical longitudinal sectional view through the hub and axle of the driving gear of a carrier; Fig. 10 is a fragmentary view in side elevation of the upper portion of one of the trips or stops; Figs. 11 and 12 are vertical cross sectional views of the lower clamping portion of a carrier showing the same respectively in brick-carrying position and brick-separating position; Fig. 13 is an enlarged side elevation of the lower end of a carrier; Fig. 14 is a vertical cross sectional view taken on the line 14—14, Fig. 13; Fig. 15 is an enlarged central vertical cross sectional view of the pivotal connection between the upper and intermediate part of the carrier; Fig. 16 is a view in end elevation of the parts shown in Fig. 8, looking toward the right; Figs. 17 and 18 are horizontal sectional details on the lines 17—17 and 18—18 respectively, Fig. 15; Fig. 19 is a vertical longitudinal sectional view of the automatic circuit controller and buffer provided for each carrier; Fig. 20 is a detail in front elevation of the buffer switch or circuit controller of Fig. 19; Fig. 21 is a cross sectional view of the clamping portion of a carrier showing a succeeding position thereof in addition to Figs. 11 and 12; Fig. 22 is an enlarged plan view of a portion of the automatic carrier delivery mechanism and adjacent brick-supplying apparatus; Fig. 23 is a vertical sectional view, partly broken away, taken on the line 23—23, Fig. 22; Fig. 24 is a diagrammatic view of the electrical connections of a carrier; Fig. 25 is an enlarged cross sectional detail of one of the pole changers of the latter; Fig. 26 is a plan view of a portion of the automatic switching mechanism; Fig. 27 is a sectional view showing in side elevation one of the stops shown in Fig. 29; Fig. 28 is a cross sectional view taken on the line 28—28, Fig. 26; Fig. 29 is a cross sectional view taken on the line 29—29, Fig. 26; and Fig. 30 shows in front elevation and top plan or diagram one of the switch operating devices and its connections with the trolley wire forming part of the apparatus.

While this invention is particularly adapted to the stiff mud process of making bricks, it will be understood that it is not restricted in this respect, or in fact in any other respect, except as required by the claims at the end of this specification, inasmuch as the invention is broadly new and of a pioneer character in the art of hacking bricks. Referring therefore, by way of illustration, to the manufacture of bricks from stiff mud or clay, the properly mixed clay is delivered in a continuous stream or streams from the die 1 of a usual stiff clay brick machine 2, to an off bearing belt 3 which travels in unison with the discharge of said stream of clay, two such streams being herein indicated. The belt 3 carries the streams or columns of transversely molded clay forward to a cut off machine 4, each of whose arms 5 is provided with a wire 6 in well known manner for severing the streams of clay into individual bricks 7, and in order that said bricks after being severed shall not be marred by the wire 6 as it comes up on the right-hand side, Fig. 1, the severed bricks are delivered by the belt 3 to a belt 8 which travels at an increased speed, thereby separating the bricks as shown on the belt 8 adjacent the cut off machine 4, thus providing ample intervals between said bricks to insure the proper upward movement of the wires 6 between and out of contact with the bricks and to facilitate the subsequent division, separation or grouping of the bricks into bunches. In order that these bricks may now be brought into the first position requisite for hacking purposes, viz., contiguous endwise relation in such numbers as may be required to constitute a unit for handling purposes in connection with the ultimate hacked stack of bricks, means is provided for the aforesaid bunching of the bricks together in said unit. While this may be accomplished by a wide variety of bunching means or mechanisms, it is preferable, according to the general arrangement of the apparatus of the drawings, to provide means for retarding the forward brick of the proposed series or unit until the required number of bricks shall have caught up with said first brick. In thus retarding the bricks it is preferable not wholly to stop the bricks or any of them but to keep the clay moving at all points from the brick machine onward. As soon as a complement of bricks has been thus bunched into a unit, the retarding means releases said bricks and they are then sent forward as a unit to suitable carrying means, preferably overhead means (having obvious advantages over a surface carrier for instance). As one of the purposes of the bunching operation at this point in the system, is to provide a suitable gap or time interval between the successive units of bricks in order to permit the coöperating carrying mechanism, etc., to perform its functions properly and with certainty, the successive bunches of bricks, having necessarily been separated from each other by the retarding action mentioned, are then moved forward at a faster rate of travel than that of the clay delivery at the brick machine, preferably at the same rate of travel as the retarding device, thereby maintaining an interval between successive units or bunches preferably corresponding to the total spaces which previously separated the bricks now constituting each unit or bunch of bricks. Also, as, preferably, the carrying means moves likewise at this same speed, it becomes at once practicable to maintain the handling of the bricks in the manner thus far described continuously as long as the brick machine runs, as no congestion can possibly take place at any point.

The means of handling the bricks from the brick machine to the carrier preferably consists of belts. The belt 8 rests on transverse supporting rolls 9 journaled in longitudinal girders 10 of the main framework and passes over end guide pulleys 11 adjustably mounted in said frame and thence around a drive pulley 12 and over an adjustable belt tightener 13, said belt having a construction which will permit the bricks to slide somewhat thereon without injury to the bricks, the belt for instance being made of sheet steel whose smooth surface readily permits this sliding movement of the bricks.

The retarding or bunching mechanism consists of stop-plates or barriers 14 arranged to be projected into the path of the leading brick of a series whenever it is desired to bunch said series together. Preferably these stop-plates, barriers, or retarding devices 14 of the bunching mechanism are supported from overhead and arranged to be lowered into retarding relation with the bricks intermittingly as required, being for this purpose mounted on transverse pivots 15 journaled at the requisite intervals on a belt 16 passing over an idler pulley 17 at one end and a driven pulley 18 (Figs. 1, 5, 23) at the other end, supported respectively by uprights 19, 20, of the general frame work. In order that the stop-plates or retarding devices 14 may be held rigidly with the proper strength of resistance to the normal onward movement of the bricks when the latter are being bunched, they are provided with special means for accomplishing this purpose, comprising arms 21 fixed on the opposite ends of each pivot shaft 15, each arm being provided with a guide roll 22 at its outer end and a similar guide roll 23 at its inner end, and a controlling track or pair of directing rails 24 is provided adjacent the lower travel of this mechanism provided at its left-hand end, Fig. 1, with an inwardly deflected end piece 25, a way 26 for the passage of the outer roll 22, and a guide end 27 for compelling said outer roll to pass through said way 26 (see also Fig. 6), so that as the belt 16 carries a stop-plate or retarding device 14 downward its rolls 22 first strike against the top inclined edges of the opposite end pieces 25 along which said rolls travel and then immediately drop down into the ways 26, where they are momentarily held by the guide ends 27 until the arms 21 have been properly turned down slightly at their forward ends, whereupon the rolls 22 travel out of said ways along the top edges of the rails 24, the latter being presently engaged also by the rolls 23 as soon as the horizontal portion of said rail is reached, the result being that the stop-plate or retarding device 14 is thereafter held by its rolls 22, 23, arms 21 and track 24 in absolutely rigid vertical position until the bunching of the requisite number of bricks together has been accomplished. This stop-plate or retarding device 14 is preferably caused to assume its said rigid vertical position in the open space between two bricks as shown at the left, Fig. 1, and as the bunching is accomplished in the preferred method of the machine of the drawings, by having the bricks travel faster than said retarding device, it will be readily understood that the leading brick quickly comes into contact with the barrier or retarding device 14 and is held thereby while its belt 8 slides beneath said brick, thereby bringing against the rear end of said brick the next following brick, which in turn is held while the belt slides beneath it until the third brick abuts against said second brick, the belt continuing to slide beneath said thus retarded three bricks until a fourth brick is brought by the belt into endwise relation against the preceding three retarded bricks. This, in the present showing of the invention constitutes a bunch or unit, and it will be understood that inasmuch as both streams are treated alike and simultaneously, it is deemed necessary to describe only one.

As it is important, in the aspect of the invention being considered, that the stop plates or retarding devices 14 shall travel in definite speed relation to the off-bearing belt 3 and cut-off 4, which deliver the bricks to the bunching mechanism and to the belt which receives the bunches of bricks from said bunching mechanism, driving mechanism is provided for insuring said travel and rendering the same instantly responsive to variations in speed notwithstanding the considerable driving power required for the subsequent belt-handling of the separated groups of bricks. For this purpose, the shaft 28 of the driven pulleys 18 is provided with a belt pulley 29 driven by a belt 30 and pulley 31 fast on the main drive shaft 32 and geared by a pinion 33 to a gear wheel 34 fast on the shaft 35 which carries the pulley 12. The belt 30 is held under proper tension by a belt tightener 36. This mechanism affords the requisite driving power not only for the retarding mechanism but for the parts which handle the segregated groups or bunches of bricks, and it tends to maintain the retarding mechanism driven at a higher speed than required; and, accordingly, to regulate said speed in accordance with the travel of the off-bearing belt 3 and the cut-off mechanism, and in accordance with the travel of the receiving belt 43 a shaft 37 is provided having a worm wheel 38 at one end in mesh with a worm 39 on the drive shaft 40 of the cut-off 4, which shaft 40 also serves to drive the belt 3, said shaft 37 at its opposite end being connected to the retarding mechanism drive shaft 28 by beveled gears 41, 42. Thus, when the speed of belt 3 varies in either direction, a corresponding variation takes place in the retarding mechanism, so that the stop plates or retarding devices 14 will meet every fourth brick whatever the speed of belt 8 may be as the relative speeds of the belts 3, 16 and 43 are not dependent upon said belt 8.

Having bunched the bricks in proper units as they are moved along by the rapid belt 8, said units of bunched bricks are carried by said belt 43 to the carrier portion of the hacking mechanism.

As already stated, it is important in the machine of the drawings that the bricks should be maintained in bunches, and accordingly suitable mechanism is provided for providing the belt 43 with a travel slightly faster than the belt 3, and corresponding, as herein shown, to the speed of retarding belt 16. The front end of the belt passes over a guide pulley 44 adjustably supported on the main frame of the machine adjacent the guide pulley 11 of the belt 8, and sufficiently forward beneath the bunching mechanism to insure preferably that a bunched unit of the bricks shall be mainly transferred to the belt 43 before it is disengaged or released by the stop plate 14 as the latter moves away from the outgoing horizontal end of the track 24. The shaft 37 acts as a coupling device or connection between the three belts 3, 16, and 43 to maintain invariably the same relative travel or proportionate speed, the belts 16 and 43 always moving faster than belt 3. The belt 43 is guided on rolls 45 journaled in the frame of the machine, the same as in the case of the previous belts, and at its rear end is adjustably supported on a driven pulley 46, Fig. 4, fast on a shaft 47 adjustably mounted on the adjacent portion of the frame of the machine and provided with a pulley 48 driven by a belt 49 and overhead pulley 50 connected by beveled gears 51 to an overhead shaft 52 which, at its forward end, is connected by beveled gears 53 to a vertical shaft 54 connected in driven relation to the shaft 28 by beveled gears 55, said shaft 28, as already stated, being controlled directly from the cut-off and off-bearing shaft 40 by means of the inclined shaft 37. As the streams of bunched bricks are moved continuously along in separated bunches or groups by the belt 43, they are picked up automatically by an overhead carrier (said carrier being by preference an overhead device, as already explained). There is a proper number of these carriers to assure the uniform presence of a carrier for each bunch of bricks as the latter are continuously moved along by the belt 43. The carriers, however, and various portions of the necessary work of hacking the bricks vary considerably as to the periods of time required at a given point or extent of travel of the bricks, and accordingly, in order that the system may be automatic and continuous, two runways or overhead tracks 56, 57, Fig. 7 are provided, each extending in a complete circuit and having mechanism for permitting the empty carriers to accumulate adjacent the bunching mechanism ready to be loaded, said mechanism automatically delivering the carriers one at a time alternately along the respective tracks 56, 57, as will presently be described. Over the loading belt 43, the tracks 56, 57 have a depressed portion 58 with a downward incline 59 at the ingoing end and an upward incline 60 at the outgoing end, and in order that the carriers may be driven at absolutely the same speed over this portion of track 58—60 as the travel of the bricks on the belt 43 therebelow, the normal driving mechanism of the carriers is rendered inoperative at this point and independent (and still automatic) driving means provided. The trolley wires (electricity being preferred as a motive power) 61 are "live" throughout their length except for a section 62, Fig. 7, which is "dead" and is substantially as long as the track portion 58—60, so that as a carrier reaches this section 62, its driving mechanism is thereby rendered inoperative by running off from the "live" wire onto the "dead" wire, and as the carrier with its load leaves the loading section its driving mechanism becomes operative to carry it along by leaving the "dead" wire and entering upon the "live" wire. As a convenient means of insuring that each carrier shall move in absolute unison with its bunch of bricks while it is being loaded with said bunch, this portion of the driving mechanism of the carrier is preferably connected with the same actuator as the brick carrying belt 43, viz. the shaft 52. Accordingly, in the upper framework is journaled a transverse shaft 63 operatively connected to said shaft 52 by beveled gears 64 and provided with a driving wheel 65 (one, of course, for each series of carriers) which drives a belt 66 guided at its opposite end by a wheel 67 whose shaft 68 is shown as journaled on the framework above the shaft 52 and preferably provided with a belt tightener 69, the lower strand of the belt being guided parallel to the track portions 58, 59 by an idler or small guide wheel 70. This belt is provided with pushers or depending lugs 71 spaced apart in accordance with the bunches of bricks on the belt 43. The carriers are delivered automatically one by one into the position shown in Fig. 2, where they are engaged by the lugs 71. For this purpose each carrier is provided at the upper end of its framework with a rigid bracket or yoke 72 whose forward end 73 projects in position to be engaged by the lug 71 and whose rear end 74 projects sufficiently to engage behind said lug as soon as the carrier has moved forward slightly, the upper horizontal portion of the track continuing forward a short distance, see Fig. 2, beyond the point of initial engagement of the lug with said bracket before the inclined portion 59 of said track permits the carrier to move downwardly. Thus when the downward movement of the carrier takes place, the lug 71 is locked between the two parts 73, 74 of the carrier bracket or yoke so that the carrier is prevented from going either faster or slower than the lug 71 and its driving belt 66.

As the carriers are delivered to the position shown in Fig. 2, they are halted by a friction spring wiper 75 which holds the carrier stationary on its track until engaged by a lug 71 which draws the carrier forward away from the wiper and along the track 58—60. Each carrier is provided with a trolley wheel 76 at the end of a trolley arm 77 mounted thereon at 78 for delivering current to a motor 79 mounted on a platform 80 at the upper end of the carrier, said motor driving a toothed pinion 81 journaled in a bracket 82 on said platform and meshing with a gear wheel 83 whose shaft 84 is journaled in the upper part of a hanger 85, being connected thereto by ratchet mechanism 86, said shaft carrying a traction wheel 87, see Figs. 8 and 16, traveling on the track 57, said hanger also being provided with a similar traction wheel 88 to give stability of position to the carrier. The ratchet connection 86 permits the carrier to be driven normally by its motor 79 and yet permits the carrier to be moved by the belt 66 independently of the motor or to be pushed forward by hand when desired. The carrier proper is suspended from the lower end of the hanger 85 on a horizontal pivot 89, and is provided with swivel or swinging movement as shown in detail in Figs. 8 and 15. While this movement may be provided by any suitable means, two parts 90, 91 are shown connected by a bolt 92 in position to receive between them a flanged ring 93 to which are bolted depending arms 94, a suitable ball bearing 95 being interposed between said flanged ring 93 and support 91. A bolt 96 carried by a lever 97 pivoted at 98 locks the supported member or members 94 against rotation when a load is being received and transported, said bolt then passing through holes 99 and 100 in the relatively movable adjacent parts. When the load is about reaching its destination, this bolt is automatically removed by a trip 101 which engages a roll 102 at the free end of said lever 97, thereby withdrawing the locking bolt 96 so as to permit the carrier and its load to be turned into proper position when required for stacking purposes. The depending arms 94 carry at their lower ends a platform 103 which supports the lifting and lowering apparatus for operating the load-receiving and clamping portion of the carrier, which forms the lowermost part thereof and is suspended from the part thus far described by cables 104 and guided by rods 105 which pass through guides or guide brackets 106 on the lower side and opposite ends of the platform 103, said cables 104 being secured to a supporting beam 107 by any suitable means, as adjustably by bolts 108. Beneath the beam 107 is a clamping frame of a multiple clamp (which has been found preferable). This clamping mechanism comprises a longitudinal web or supporting member 109 of the frame, provided at its upper edge with laterally projecting longitudinal angle irons 110, Fig. 14, and to its lower edge are riveted at 111, Fig. 9, a series of relatively heavy supporting brackets in the form of laterally projecting rods 112 extending in opposite directions from an intermediate bearing 113 for a shaft 114. This web-like frame is yieldingly supported at its opposite ends by short guide rods 115 which pass through guide eyes 116 in the beam 107 and extend at their upper ends through cross heads 117 adjustably connected by tie rods 118, Fig. 14, to the angle-iron top 110 of the clamping frame, springs 119 surrounding said guide rods 115 and engaging at their lower ends the beam 107 and at their upper ends the cross heads 117. To limit the upward movement, stop bars 120, Fig. 14, are adjustably clamped by set screws 121 to the tie rods 118. On each arm 112 is slidably mounted an independently movable clamping jaw or blade 122 to coöperate with inner jaws 123 in clamping the bricks as shown in Fig. 14. These four jaws or blades 122, 123 of each set (four sets being herein shown, Fig. 13) are relatively movable. Stationary cams 124 are secured to the upper inner ends of the jaws 122 to coöperate with cams 125 and springs 126 carried by the arms 112, as best shown in Fig. 21. The rock shaft 114 is provided with cams 127 properly spaced apart thereon to operate the respective pairs of jaws 123, see Figs. 11 and 12, when said shaft is rotated by its handle 128. The two inner jaws 123 preferably extend the entire length of the carrier, *i. e.* the length of four bricks, while a plurality of the outside jaws 122 are preferably provided, each adapted to engage a separate brick so as to provide for those slight variations in thickness of the bricks which invariably occur in brick manufacture. The jaws slide on the arms 112 as stated, and are prevented from turning thereon by studs 129 projecting from the upper ends of the inner jaws 123. Each cam 125 has an arm 130, said arms having connection permitting them to be rocked together and yet move toward and from each other, said connection consisting of a transverse head 131 on one arm provided with a reduced portion 132 telescoping into a socket end of a coöperating head 133 on the other arm swinging in a slot 134 in the web-like frame 109 when actuated by a bell crank lever 135, Fig. 13, to which all the arm heads 133 are connected by a link 136. The bell crank 135 is pivoted on one end of the rods 112 and provided at its lower end with a tripping roll 137 to be automatically actuated in one direction by a latch or trip 138, Fig. 13, pivoted at 139 on the girder 107 of the carrier frame and in an opposite direction by a stationary cam trip 140, Fig. 4, adjacent the brick-carrying belt 43. Thus, as the carriers move down the track 59 into loading position over belt 43, the clamping jaws 122, 123 occupy the open positions shown in Fig. 21 with relation to the bricks, having been moved into said position by the coöperation of the roll 137 and latch 138 when delivering the load of bricks at the hacking car.

Flaring guides 141 direct or center the jaws so that they come down in proper relation to the bricks with the jaws 123 between the two rows of bricks as shown in Fig. 21 and the jaws 122 at the opposite sides of the double row. Then, as the carrier, moving in unison with the bricks, is passing the cam trip 140, the latter is engaged by the roll 137 and thereby all of the arms 130 are swung from the position shown in Fig. 13 to the opposite ends of the slots 134, thereby rotating the cams 125 with relation to the cams 124 and permitting the jaws 122, under the action of springs 126, to close tightly onto the bricks as shown in Fig. 14. When the roll 137 is lifted by the cam 140, it strikes against the side and slightly deflects the depending pivoted latch 138 where the latter hangs resting against one side of said roll until the car starts up the incline 60, whereupon the weight of the load of bricks compresses the springs 119, permitting the frame 109 to lower sufficiently to carry the roll 137 below the lower end of said latch 138, which then swings back into vertical position immediately above said roll, so that, when the operator lowers the carrier with its load of bricks onto the oven car or stacking car, the latch reverses the movement of the lever 135 and thereby partially releases the bricks. The relative vertical movements of the different parts of the frame, aside from those already mentioned, are accomplished by the electric mechanism carried on the platform 103. The hoisting cables 104 pass over sheaves or drums 142, Fig. 8, on the opposite ends of a shaft 143 connected by a train of gears 144 to the armature shaft of a hoisting motor 145 whose other end is provided with a brake wheel 146, Fig. 3, which is embraced by a pair of brake levers 147 pivoted at 148 to a bracket 149 rigidly fastened to the frame of the motor. This bracket also carries an electromagnet 150 (energized from the field circuit of the motor) whose two cores 151 connect with the upper ends of said levers 147 for releasing the brake in opposition to a brake-applying spring 152. Thus, when the current is turned on for running the motor, the brake releases the motor and, when the current is cut off, the electromagnet is thereby deënergized and the spring 152 applies the brake levers instantly to stop the motor. The wiring of the carrier is shown in Fig. 24, where it will be seen that two circuit controllers 153, 154 are provided to enable the operator to control the carrier, the former for the circuit of the hoisting motor 145 and the latter the traction motor 79. Normally the circuit of the traction motor 79 is closed, so that it becomes necessary to operate the controller 154 thereof only when the bricks are to be deposited on the oven car, at which time it is desirable that the operator should be able not only to stop the carrier but to manually shift the carrier backward or forward as may be required to position the carrier with relation to the oven car. By means of the controller 153, the motor 145 is started to unwind or wind the cables 104 to lower the carrier onto the oven car for unloading the bricks, or to raise the carrier from said car when the bricks have been unloaded. It is desirable that this shall be under the control of the operator, as the extent of downward movement of the lower portion of the carrier and its load decreases as the pile of hacked bricks on the oven car grows. As, however, the upward movement should always be stopped at the same point, automatic means is provided for stopping the motor 145 when the lower portion, including the beam 107, has reached its proper normal upper position, said means being herein shown as comprising a switch or cut-out 155 whose movable member 156 bridges between two contacts 157 when in its normal lowered position and breaks the circuit between said contacts when in raised position. The lower end of this movable member is automatically raised by engagement with a part 158 of the beam 107.

Referring to Fig. 24, a wire 159 leads from the trolley and thence by a branch 160 to the field 161 of motor 79 and the field 162 of motor 145 and by branches 163, 164 to the pole changers or controllers 153, 154. At one terminal of the wire 164, the pole changer is shown as completing the circuit between contacts 165, the circuit continuing thence by wires 166, 167, through the armature of motor 79, wires 168, 169, contacts 170, wire 171, a buffer switch 172 and to the ground 173 (on the frame of the carrier). This is the circuit for the forward drive of the carrier. The circuit for the backward drive is from the trolley wire and trolley through conductors 159, 160, field 161, wire 164, contacts 174, wires 175, armature of motor 79, wire 167, contacts 176, and thence by a wire 177 to ground. The hoisting circuit for motor 145 extends from the trolley wire and trolley by wires 159, 160 to field 162 of said motor, and by wire 159 to the branch conductor 178 of the circuit closer or cut-out, from which a wire 179 leads to contacts 180 of the controller 153, wires 181, 182, 183, armature of motor 145, wire 184, brake 150, wires 185, 186, 187, contacts 188, and wire 189 to ground. The lowering circuit of motor 145 is from the trolley by wires 159, 160, field 162 to ground, and by wire 159, 168, contacts 190, wires 186, 185, brake 150, wire 184, armature of motor 145, wires 183, 182, and contacts 191 to ground. As shown in Figs. 24 and 25, the controller 154 is normally held in position to close the forward drive circuit of motor 79 by a spring 192, Fig. 25, which automatically returns the controller to said position whenever the controller is reversed to close the backward drive circuit of said motor or moved into its middle open position to stop said motor. The controller 153 is similarly constructed and automatically operated by its spring 192, Fig. 25 (said figure showing both of said controllers) which holds the controller in position to close the hoisting circuit of motor 145.

The buffer switch 172 mentioned is shown as bolted to the front of the carrier hanger against the bracket or part 72, see Fig. 8, and further shown in detail in Fig. 19, where it will be seen that it comprises a plunger 193 carrying a piston head 194 normally projected by a spring 195 maintained in central position by a finger 196 in a barrel 197. On the front of the piston is a contact ring 198 normally in engagement with an insulated spring contact ring 199 and electrically connected at 200 to the wire 171 previously mentioned. This buffer switch or combined dash-pot and switch, when engaged so that its plunger 193 is moved back, serves to interrupt the "ahead" circuit of the motor 79 and thereby bring the carrier to a halt. This happens when one carrier comes up to a preceding carrier, whereupon said plunger strikes a stop 201 provided on the rear of each carrier frame, see Figs. 8, 22, as for instance when the accumulated carriers are awaiting distribution for loading. As already stated, the carriers are delivered one by one on the tracks 56, 57 alternately. To accomplish this automatically, stop mechanism is provided, herein shown as comprising a depending stop-arm 202 whose oblique ends 203, 204, Figs. 2, 22, and 23, serve respectively to operate the buffer switch and thereby stop a carrier on track 56 and then on track 57. The stop-arm 202 is given the required swinging movement by a rock shaft 205 journaled in the adjacent cross beams 206 of the main frame and positively rocked by a short arm or lever 207 extending laterally from the arm 202. Said short arm is operated by the arm 208 of a lever which is pivoted at 209 on one of the main longitudinal overhead girders 210 which are connected by the cross beams 206 to support most of the apparatus thus far described, the outer end of said lever being forked and provided with two cam rolls 211 positively actuated by a cam 212 fast on the shaft 52, said cam and its driving mechanism being so proportioned as to swing said stop from in front of a carrier every time a carrier is wanted for loading, the removal of the stop permitting the buffer switch to close, thereby starting the carrier along by its own motor 79. To prevent a second carrier following the first on the same track, opposite stops 213, 214 are provided at the ends of a rod 215 sliding in guide brackets 216 secured to the respective tracks 56, 57 and to a cross beam 217, said rod being actuated by a lever 218 pivoted intermediate its length at 219 to a stationary bracket 220 and actuated by a rocker arm or lever 221 fast on the shaft 205 at the end opposite the stop-arm 202. Thus the stops 213, 214 operate in unison with the stops 203, 204 but in opposite directions, and constitute a kind of double-acting escapement which controls the return of the carriers to the loading point, where they are taken along by the belt 66. For example, when the stop 203 is swung away from track 56, Fig. 22, it releases the carrier which is shown in full lines on track 56 in said figure, permitting the buffer switch to close so that the motor of said carrier takes it along over said track, and at the same time the stop 213 is moved in front of the next following carrier on said track, which it holds stationary. This movement of the stop 213 causes the opposite stop 214 to move away from holding position, thereby releasing the carrier which it was previously stopping, which carrier immediately goes forward until it is halted by the stop 204 which is now in stopping position over the track 57. The stops and buffer switch, with its relatively long yielding plunger, and the motor brake and circuits, coöperate in stopping the carriers properly and relieving the stops themselves of the strain and impact which would otherwise accompany the stopping movement, as practically all the strain brought against the stops is the spring resistance of the plungers. The next operation of the stops shifts stop 203 over track 56, stop 204 away from track 57, stop 213 away from track 56 and stop 214 over track 57, permitting the empty carrier on track 57 to move on to loading position and another empty carrier to get into position on track 56 for the subsequent delivery to follow the one just released on track 57. In this way the empty returning carriers are delivered to the belt 66 one at a time, first on one track and then on the other. In practice, with the apparatus herein shown, about twenty four carriers are employed, so that loaded carriers are continuously arriving in position to be unloaded at the oven-car tracks 222, 223, Fig. 7, and empty carriers are continuously arriving at the carrier-distributing point where the tracks 56, 57 converge as shown in Figs. 7 and 22. The carriers are made rights and lefts, twelve (in the example being given) of the former for track 57 and twelve of the latter for track 56. The mechanism which intermittingly operates the distributing stops 203, 204, 213, 214 provides a definite time interval between operations in unison or harmony with the time interval or travel of the pushers 71, so that there is always a carrier ready when it is required for loading. Thus it is made possible and practicable to handle the bricks automatically notwithstanding that they are cut off and fed forward continuously.

The automatic stop devices and distributing mechanism take care of the surplus carriers at the feeding-in end of the apparatus, which surplus carriers are required to make sure that the carrying mechanism of the bricks shall be adequate for the continuous supply of the latter in accordance with the brick machine and cut-off mechanism. And in order to permit the uninterrupted handling of the continuously delivered bricks without any possibility of congestion or stoppage at the outgoing end of the apparatus, one or more additional sets or pairs of extension loop tracks are provided, in addition to the two loop tracks 56, 57, one pair thereof 224, 225 being shown in Fig. 7 as sufficient to render the invention clear and readily understood, the several branch or lateral carrier tracks being arranged to deliver the carriers in hacking position with relation to the oven-car tracks 222 already mentioned, on which oven cars 226 travel. When an oven car has received a complete load of hacked bricks, it is moved over its track 222 to the right, Fig. 7, to the drier or kiln (not shown), and thereafter the empty oven cars are returned to their tracks 222 via return tracks 227, 228, the latter being lower than the tracks 222, 227 and having mounted thereon a shuttle car 229 provided with usual stub tracks 230 on the same level as the track 227 so as to receive therefrom the returning empty oven car and transfer the same from track 228 to the desired track 222 to be again loaded. In order that the carriers may be properly distributed to the lateral tracks, automatic switches 231, 232 are provided for controlling the connection between the inner ends of the loop tracks 224, 225 and the central straight-line portions of the tracks 56, 57, and automatic switches 233 for controlling the outgoing ends of the loops 224, 225 where they again connect with the main tracks. As herein shown, the switches 231, 232 are normally in line with their respective tracks 56, 57, but when the trolley of a carrier travels along its trolley wire 61 slightly beyond the switch, it reaches a short section 234 of separate and normally insulated wire which operates to throw the switch 231 into line with the track 224 for the next carrier, and when said next carrier has passed along beyond the switch 231 onto the track 224, its trolley rides onto a similar separated and normally insulated section 235 which operates (through mechanism presently described) to throw said switch 231 back again to the main line for the next carrier which comes along on that track. In other words, each switch 231, 232 is operated automatically by the carriers which travel over it to direct the successive carriers which pass over the switch first to one lateral track and then to the other lateral track on that side of the yard, and as said carriers come alternately on the respective tracks 56, 57, the result is that a carrier is first delivered to the lateral portion of the track 56, the next carrier to the lateral portion of the track 57, the next carrier to the lateral track 224, the next carrier to the lateral track 225, the next carrier to the lateral portion of track 56 again, the next carrier to the lateral portion of track 57 again, and so on, this carrier-delivering being continued automatically so that no congestion can possibly take place. The switch 233 is similarly controlled through the agency of a separate section of normally insulated trolley wire 236 for the lateral portion of track 56 and 237 for the lateral track 224, said two sections 236, 237 serving to throw the switch 233 back and forth from one track to the other, thereby passing the empty carriers back onto the return stretch of track alternately from the main lateral track 56 and the auxiliary loop track 224. All these switches and their operating mechanisms are alike, and hence a description of one will answer as a description of all. The switches themselves are short sections of the track hinged at one end at 238, Fig. 26, and suspended at the other end by a hanger 239 from an overhead carrying beam or carriage 240. Fig. 28, preferably provided with truck wheels or rollers 241 to travel on guides 242 supported on beams 243, 244. Stops 245 (consisting of uprights containing blocks of rubber) limit the swing of the switch. The carriage 240 is connected by a link 246, Figs. 26, 28, 30, with a double bell crank lever 247 forming part of a switch-operating instrument 248. The latter comprises actuating solenoids 249, 250 and relays 251, 252, to the former of whose cores 253, 254 said bell crank is connected by links 255, 256, a dash pot 257 being preferably provided to insure proper operation. When the solenoid 249 is energized, the lever 247 operates to throw the switch (231, 232, or 233, as the case may be) into position to close the main track, and when the solenoid 250 is energized, said lever operates to throw the track switch into position to connect with the loop track 224 (or 225 as the case may be).

Conductors 258, 259, see Fig. 30, of an energizing circuit are provided for the switch operating device 248, the latter leading directly to one end of the solenoid windings 249, 250. The conductor 258 leads to one of a pair of contacts 260 (connected by a resistance 261) for the relay 251 and to one of a pair of contacts 262 (connected by a resistance 263) for the relay 252. Corresponding pairs of contacts 264, 265 are provided adjacent the two solenoids 249, 250. A wire 266 is shown as connecting the outer contact 262 with the inner contact 264 and a wire 267 as connecting the outer contact 260 with the inner contact 265. Insulated bridging contacts 268, 269 are shown as mounted on an extension 270 of the relay core 271 to bridge respectively across the adjacent pairs of contacts 260, 264, being normally in the position shown in Fig. 30, supported on a buffer spring 272, said core extension being directed in its movements by stationary guides 273. Similar insulated bridging contacts 275, 276 are provided on a similar extension 277 of the core 278 of the other relay directed by guides 279 and provided with a spring 280. Normally, with the switch in either of its two positions, the relays are deënergized and the bridging contacts 268, 275 are closed against their contacts 260, 262. The winding terminals or connections 281, 282 of the relay 251 connect respectively to the adjacent trolley wire 61 and insulated section 236, and the terminal connections 283, 284 of the relay 252 connect respectively to said trolley wire 61 and the insulated section 237, so that when the trolley wheel of a carrier passes onto the section 236, a circuit is completed through the relay 251 which lifts its core or armature. Thus, when either of the relays is energized, it pulls up on its core and thereby short-circuits the resistance of its solenoid (the solenoid 250 being actuated by the relay 251 and the solenoid 249 by the relay 252) which is therefore energized, and at the same time the circuit of the other solenoid is broken by the raising of the bridging contact 269 or 276 as the case may be. The circuit for the relay 251 is from trolley wire 61 through wire 281, relay 251, wire 282, section 236, the trolley of the carrier, wires 159, 164, Fig. 24, field 161 of motor 79 and to ground through the framework of the carrier. When the trolley wheel of a carrier passes onto the section 237, the relay 252 is energized through its circuit from trolley wire 61, wires 281, 283, relay 252, wire 284, section 237 and thence as before to the ground through the trolley, motor, and frame. To make it impossible that two carriers can meet at the switch 233 or a carrier become derailed at this point, this switch is provided with automatic stops 285, 286, Figs. 7, 26, and 29, connected to a rock shaft 287 and its arms 288 by a link 289, crank 290, rock shaft 291, lever 292 and link 293 for the stop 285, and by a link 294 for the stop 286, said rock shaft 287 being rocked by a crank 295 and link 296 connected to the switch hanger 239, Fig. 28. In front of each hacking stand or station, the trips or unlocking cams 101 already mentioned are provided, said trips being shown in Figs. 10 and 16 as pivoted at 297 to the upper end of a hollow post 298 and connected by a rod 299 with an operating treadle (not shown) by means of which the operator throws the cam upward with his foot when it is desired to unlock the lower portion of the carrier so as to permit it to be turned to deposit its load transversely of the previously deposited load. To insure that, when the carrier is turned, it shall stop in the proper position, the upper member 90 of the swivel connection of the carrier is provided with a slot 300, Fig. 17, in which projects a pin 301 from the lower member, a spring 302 being preferably provided, Fig. 18, for returning the parts to their normal unlocked position, said spring being secured at one end 303 to the movable member 93 and at its other end to an arm 304 of the stationary part 91. This arrangement for permitting the carrier to turn at right angles to its normal position permits one layer of bricks to be laid in the opposite direction from the preceding layer, as required for hacking the bricks, the spacing apart of the rows being accomplished by rocking the shaft 114 and its cams 127 in one direction by the hand operated lever 128 already mentioned, said shaft being automatically restored to its normal position, as shown in Fig. 11, by its lever 305 whose free end carries a rod 306 provided with an adjustable abutment or flange 307 over which fits telescopically a sleeve 308 pivoted at 309 to the bracket which carries the latch 138.

In operation, the brick machine delivers its plurality of streams of mud continuously in the well known manner, said streams (for the purposes of description and illustration being herein considered as two) being carried by the off-bearing belt 3 to the continuously operating cut-off mechanism 4, which severs the streams of mud into individual bricks. The severed bricks are received by the more rapidly moving belt 8 and thereby separated from each other as required by the cut-off machine, whereupon a leading brick of each stream, at predetermined intervals, is engaged by a stop plate 14 of the bunching apparatus and thereby retarded in its forward motion until the desired number of bricks constituting a group or bunch have been automatically brought together (four bricks being herein considered as constituting a group or bunch to meet the requirements of the carriers as herein illustrated). As soon as a group of bricks has thus been formed or bunched together, the stop plate of the bunching apparatus escapes therefrom and the group is taken forward from the fast belt 8 by the slower moving belt 43 with a slightly faster movement than the belt 3, or in other words faster than the molded bar or column of clay and preferably slower than the separating belt 8. Meanwhile the automatic carrier distributing or delivering mechanism, herein shown as located just over the bunching mechanism, has released a carrier, the stop 204, Fig. 22, having escaped from in front of the buffer switch 172 of said carrier, which has thereupon started the motor 79, thereby causing said carrier to travel along its track 57 to the position shown in Fig. 2, where it is momentarily halted by the friction stop 75, current having been cut off from the driving motor by the entrance of the trolley wheel upon the "dead" section 62 of the trolley wire. Here the carrier remains momentarily until engaged by a pusher 71 of the driving mechanism which is provided at the loading section, when said carrier is moved positively forward under the control of this driving mechanism, and is therefore not only moved forward at exactly the right time with relation to the subjacent traveling bricks on the belt 43 but is moved in perfect unison with said bricks. As the carrier goes forward at equal pace with the bricks which it is to receive and thereafter carry in suspended relation, it is gradually lowered by the inclined track 59, Fig. 2, to the load-receiving level, and its clamping jaws 122, 123 are directed by the guides 141 into correct straddling relation with the two streams of severed bricks as shown in Fig. 21. As the carrier passes the stationary cam 140, the roll 137 is automatically raised by said cam so as to turn the cranks 135, arms 130, and cams 125 from the open position shown in Fig. 13 to their closed position, thereby closing all the clamping jaws 122 onto the bricks as shown in Fig. 14. The bricks having thus been properly clamped in loaded relation to the carrier, and therefore no longer requiring the support of the traveling belt 43, are lifted by the carrier from the belt preferably by the inclined portion 60 of the track, and at the same time the carrier is released by the pusher plate 71 which has been moving along during the loading operation, and thereafter proceeds with its own power or motor 79, which receives current from the "live" wire 61 immediately upon passing from the "dead" wire 62 as soon as the carrier had received its load and been released by the pusher mechanism. The carrier proceeds automatically along the main track to such branch track as the switch 232 may be set for. As soon as it reaches the track 223, the yard operator stops the carrier by the controller 154, Fig. 24, over the oven car 226 on said track 223 (or either of the tracks 222 as the case may be). He then shifts the carrier backward or forward as may be required to bring it into correct position with relation to the oven car, and, by means of the controller 153, operates the motor 145 and hoisting drums and cables to lower the clamping portion of the carrier with its bricks onto the car. As the bricks are being lowered, the operator pushes upwardly upon lever 128, thereby separating the two rows of bricks from the position shown in Fig. 11 to the hacked position shown in Fig. 12. As the bricks reach the car and are thereby stopped, the cross beam or frame 107 continues downward slightly until its latch 138 (which has been resting idly upon roll 137) has acted upon the latter to shift the levers 135 and connected mechanism back to the position shown in Fig. 13, thereby opening or separating the clamping jaws 122 so as to release the bricks. As this is taking place, the shaft 114 and its cams 127 are rocked back again to the position, Fig. 11, by the lever and connections 305—309, due to the same movement of said cross beam 107, thus permitting the springs 126 to shove all of the jaws toward the middle.

After the bricks are unloaded, the operator, through the controller 153, raises the clamping section of the carrier to its normal position, where it is halted by the automatic cut-out 156, and, through the controller 154, starts the carrier upon its return trip. The bell crank 135 is in an intermediate position and the clamping plates are halfway open. As the carrier passes along the return stretch of its track 56 or 57, it passes a post 310 which strikes an arm 311 projecting from the rotary member 93 of the carrier in position to hit said post in case the carrier has not been rotated back to its proper load-receiving position (where it is caught and locked by the bolt 96 which slips into its socket 99) and then the roll 137 strikes and is thrown fully down by a cam 312, thus restoring the clamps to their wide-open or fully expanded position, as shown in Fig. 21, ready to receive another load of bricks when they arrive at the loading section. Meanwhile, other carriers have been coming along, distributed automatically by the carrier releasing and distributing mechanism, first a carrier on the track 56 and then a carrier on the track 57, and so on alternately, said carriers being taken at the "dead" trolley wire sections 62 by the positive uniformly traveling driving mechanism 71, etc., loaded automatically, and then again restored to the "live" trolley wire where said carriers have been again driven along by their own mechanism and automatically switched onto one side track 56, then onto the other side track 57, then to the side track 224 and the side track 225 (and so on, in case there are more side tracks in accordance with the speed and capacity of the plant), so that no congestion is possible and no interruption in the free on-moving loading, transportation, and hacking of the bricks as fast as they are molded, cut, and delivered. The aim of the invention is to effect the hacking of bricks solely by automatic means as perfectly, or in fact more perfectly, than has heretofore been done by hand, thereby increasing the output of the plant, decreasing the labor item, largely eliminating the injuring of the bricks, and facilitating the entire manufacture.

One aim of the present embodiment of the invention has been to utilize so far as possible elements and means ready at hand, in order that the cost of the apparatus might be as low as possible, but it will be understood that the invention is not restricted in this respect. For instance, while electricity is convenient as a motive power, the apparatus will be accommodated to whatever motive power is available in any given plant, and so likewise the arrangement of the apparatus will be modified to meet the requirements of the various plants, all without departing from the spirit and scope of the invention. This is believed to be the first automatic brick-hacking apparatus, and accordingly the claims hereinafter contained are intended to be broad and commensurate with said pioneer character of the invention. While it is preferable to employ all the features herein disclosed as constituting the apparatus or system, the invention is novel in most of its details or subcombinations, which are accordingly claimed *per se*, irrespective of whether the other portions of the apparatus are used or not. For instance, the provision of maintaining the brick material under continuous motion throughout the steps of forming the bricks, bunching them and transporting them, is considered preferable, but certain of the claims hereinafter are intended to cover independently of this continuous movement those features of the invention which are not dependent thereon, as it is new and advantageous to hack bricks automatically even though they are not run out on a continuously moving belt, and so likewise it is new and advantageous to bunch the bricks as they are delivered from the cut-off machine irrespective of whether they are thereafter taken by a carrier from a moving belt.

As to certain features of showing broadly common to this application and to my copending application Ser. No. 586,412 filed Oct. 10, 1910, I desire it understood that the present case is intended to cover the broad combinations of the initial receiving conveyer portion, the subsequent bunching and handling mechanism with connections for operating these several parts in timed relation. The one-way controlling connection shown in the present case as wormwheel 38 and worm 39 between the off-bearing belt and the subsequent conveyer system whereby the subsequent conveyer system is controlled in its movements by the off-bearing belt, while leaving the off-bearing belt substantially unaffected by variable impulse from the drive of the subsequent conveyer system, is claimed in said copending application, and this particular combination is not claimed either broadly or specifically in the present case.

Having described the invention, what is claimed as new and desired by Letters Patent is:

1. The combination with means for supplying a continuous succession of bricks, of means for automatically receiving the bricks, means for delivering said bricks in bunches for hacking purposes and means for operating said parts in timed relation.

2. The combination with means for supplying a continuous succession of bricks, of means for automatically receiving the bricks, and means for transferring said bricks in bunches to a car and delivering the bricks in hacked relation.

3. The combination with means for supplying a continuous line of molded brick material from a brick machine, and mechanism for converting said line into a continuous succession of separated bricks, of bunching means to bunch the separated bricks, when they leave said converting mechanism, into groups for further transportation.

4. In an apparatus of the kind described, means for continuously delivering a stream of bricks in separated relation, and automatic bunching mechanism for bringing said bricks into predetermined bunches for further handling.

5. In an apparatus of the kind described, means for continuously delivering a stream of bricks in separated relation, means for then adjusting said bricks into separated groups, and carrier means for engaging and carrying independently the separated groups.

6. In an apparatus of the kind described, means for continuously delivering a stream of bricks in separated relation, means for then adjusting said bricks into separated groups, and carrier means for engaging and carrying independently the separated groups, said carrier means including mechanism permitting the automatic delivery of said bricks in hacked relation.

7. In an apparatus of the kind described, means for delivering successive groups of bricks in position for transportation, and moving carrier means for receiving said moving bricks and delivering said bricks to a hacking stand in hacked relation.

8. In an apparatus of the kind described, cut-off mechanism for severing the bricks, including means for continuously feeding the brick material in position to be severed, mechanism for receiving and continuously moving the severed bricks, and grapple mechanism for taking the moving bricks from said moving mechanism and transporting said bricks.

9. In an apparatus of the kind described, means for delivering a continuous series of separated bricks from brick forming mechanism, mechanism for receiving and bunching together said separated bricks in groups, and carrier mechanism for receiving and transporting said bricks in individual groups.

10. In an apparatus of the kind described, means for delivering a continuous series of separated bricks from brick forming mechanism, mechanism for receiving and bunching together said separated bricks in groups, means for receiving the groups of bricks, and carrier mechanism movable at the same speed as the groups of bricks for receiving and transporting the latter.

11. In an apparatus of the kind described, means for delivering a continuous series of separated bricks from brick forming mechanism, mechanism for receiving and bunching together said separated bricks in groups, a series of carriers, and means for moving said carriers into transporting engagement with said individual groups of bricks one at a time.

12. In an apparatus of the kind described, a conveyer system arranged to receive a continuous stream of bricks and to deliver the same in separated bunches, closed-circuit guiding means, a part of which extends alongside a delivery portion of said conveyer system, and a carrier constructed to carry one of said bunches at a time and guided by said guiding means.

13. In an apparatus of the kind described, means for receiving a continuous stream of bricks and for delivering the same in separated bunches, a subsequent brick-conveyer continuously movable at a definitely faster rate than the brick stream delivery, closed-circuit guiding means, a portion of which extends alongside said subsequent conveyer, and a carrier adapted to receive a brick bunch from said conveyer, guided by said guiding means.

14. In an apparatus of the kind described, a conveyer system having a part arranged to receive a continuous stream of bricks, and another part to deliver such bricks in separated bunches, means for bunching the bricks, a carrier constructed to handle one bunch at a time, a closed circuit guide for said carrier, a part of which extends alongside the delivery portion of said conveyer system, and a car for receiving said brick bunches from said carrier, arranged adjacent another part of the closed circuit guide of said carrier.

15. In an apparatus of the kind described, means for receiving a continuous stream of bricks and for delivering the same in separated bunches, including a subsequent conveyer portion movable faster than the brick stream delivery, carriers for receiving the successive brick bunches, and closed circuit ways for said carriers, a portion of said ways extending over and generally parallel to said subsequent conveyer portion.

16. In an apparatus of the kind described, means for receiving a continuous stream of bricks and for delivering the same in separated bunches, including a subsequent conveyer portion movable faster than the brick stream delivery, carriers for receiving the successive brick bunches, closed circuit ways for said carriers extending on opposite sides of said subsequent conveyer portion, a portion of said ways extending over and generally parallel to said subsequent conveyer portion, and cars arranged adjacent portions of said ways to receive the brick bunches from said carriers.

17. In an apparatus of the kind described, means for receiving a continuous stream of bricks and for delivering the same in separated bunches, including a subsequent conveyer portion for advancing such separated bunches, a driver for said elements, a carrier to receive one at a time of such bunches, a closed circuit way for said carrier, having a portion extending alongside said subsequent conveyer portion, and means for controlling the movement of said carrier along such portion from said driver in timed relation to said subsequent conveyer.

18. In an apparatus of the kind described, means for receiving a continuous stream of bricks and for delivering the same in separated bunches, including a subsequent conveyer portion for advancing such separated bunches, a driver for said elements, a carrier to receive one at a time of such bunches, a closed circuit way for said carrier, having a section extending over and generally parallel to said conveyer portion, said section having at one point a dip to bring said carrier into engagement with the brick bunches and at another part an upward incline to raise said bunches from said conveyer portion.

19. In an apparatus of the kind described, a brick machine provided with an off-bearing belt for delivering substantially continuous streams of molded brick material, a cut-off machine operating in unison with said brick machine for severing said streams of brick material into bricks, provided with a separating belt traveling faster than the off-bearing belt, and automatic bunching mechanism coöperating in timed relation with said separating belt to bunch together said bricks into groups.

20. In an apparatus of the kind described, a brick machine provided with an off-bearing belt for delivering substantially continuous streams of molded brick material, a cut-off machine operating in unison with said brick machine for severing said streams of brick material into bricks, provided with a separating belt traveling faster than the off-bearing belt, bunching mechanism coöperating with said separating belt to bunch together said bricks into groups, and a receiving belt traveling faster than said off-bearing belt for receiving said bricks when bunched into groups.

21. In an apparatus of the kind described, a brick machine provided with an off-bearing belt for delivering substantially continuous streams of molded brick material, a cut-off machine operating in unison with said brick machine for severing said streams of brick material into bricks, provided with a separating belt traveling faster than the off-bearing belt, and bunching mechanism cooperating with said separating belt to bunch together said bricks into groups; including a retarding device connected to move slower than the separating belt for engaging a leading brick and holding said brick back until the separating belt has moved a complement of bricks together to form a group.

22. In an apparatus of the kind described, a brick machine provided with an off-bearing belt for delivering substantially continuous streams of molded brick material, a cut-off machine operating in unison with said brick machine for severing said streams of brick material into bricks, provided with a separating belt traveling faster than the off-bearing belt, and bunching mechanism cooperating with said separating belt to bunch together said bricks into groups, including a retarding device to engage and retard a leading brick, and means for moving said retarding device forward at a slower speed than said separating belt.

23. In an apparatus of the kind described, a brick machine provided with an off-bearing belt for delivering substantially continuous streams of molded brick material, a cut-off machine operating in unison with said brick machine for severing said streams of brick material into bricks, provided with a separating belt traveling faster than the off-bearing belt, and bunching mechanism coöperating with said separating belt to bunch together said bricks into groups, including a retarding device to engage and retard a leading brick, and means for moving said device at a higher speed than said off-bearing belt.

24. In an apparatus of the kind described, a brick machine provided with an off-bearing belt for delivering substantially continuous streams of molded brick material, a cut-off machine operating in unison with said brick machine for severing said streams of brick material into bricks, provided with a separating belt traveling faster than the off-bearing belt, and bunching mechanism coöperating with said separating belt to bunch together said bricks into groups, including a retarding device to engage the forward end of a leading brick and retard the same until a group of bricks has come together, and means to move said device into the space between two separated bricks when entering upon its bunching operation and away from said end of the brick when the bunching operation is finished.

25. In an apparatus of the kind described, a brick machine provided with an off-bearing belt for delivering substantially continuous streams of molded brick material, a cut-off machine operating in unison with said brick machine for severing said streams of brick material into bricks, provided with a separating belt traveling faster than the off-bearing belt, and bunching mechanism coöperating with said separating belt to bunch together said bricks into groups, including an endless belt, a stop plate carried by said belt to be moved thereby into and out of operative relation with the bricks, and coöperating means for maintaining the stop plate unyielding when in operative engagement with a brick.

26. In an apparatus of the kind described, a brick machine provided with an off-bearing belt for delivering substantially continuous streams of molded brick material, a cut-off machine operating in unison with said brick machine for severing said streams of brick material into bricks, provided with a separating belt traveling faster than the off-bearing belt, and bunching mechanism cooperating with said separating belt to bunch together said bricks into groups, including a stop plate adapted to be moved into engagement with a leading brick for retarding said brick until a group has been brought together, and means for maintaining the movement of said plate in a predetermined relation to the rest of the apparatus.

27. In an apparatus of the kind described, a brick machine provided with an off-bearing belt for delivering substantially continuous streams of molded brick material, a cut-off machine operating in unison with said brick machine for severing said streams of brick material into bricks, provided with a separating belt traveling faster than the off-bearing belt, and bunching mechanism coöperating with said separating belt to bunch together said bricks into groups, including a retarding device to engage a leading brick and retard the same until a group has been brought together, and actuating mechanism for said retarding device positively connected to the actuating means of said cut-off machine and yieldingly connected to the actuating means of said separating belt.

28. In an apparatus of the kind described, automatic means to bunch together bricks in the desired units required for hacking, and automatic carrying mechanism for carrying said bunched-together units and depositing them in hacked relation.

29. In an apparatus of the kind described, mechanism for continuously delivering a stream of bricks, mechanism for carrying said bricks forward in successive bunches to a hacking station, and means for introducing a time element between the deliveries of bunches, without interrupting the aforesaid continuous movement of the bricks, for permitting the proper handling of the bricks at the hacking station.

30. In an apparatus of the kind described, the combination with mechanism, for continuously delivering a stream of green brick-material in the form of bricks, and carrying means for carrying said bricks to hacking stations, of means for providing a time interval at the beginning of each carrying movement and means for providing another time interval at the end of each carrying movement for enabling the carrying means to take its load of bricks and deposit its load in hacked relation without interfering with the said continuous movement of the stream of bricks.

31. In an apparatus of the kind described, an off-bearing belt for continuously delivering a stream of brick material, cut-off mechanism for severing said stream into bricks, including a separating belt traveling at a faster speed than the off-bearing belt, a receiving belt, for receiving the bricks from said separating belt, and a bunching mechanism, including a retarding device connected to move slower than the separating belt for retarding a leading brick until a plurality of bricks are bunched together, said retarding device maintaining engagement with said brick until the entire group of bunched-together bricks is received by said receiving belt.

32. In an apparatus of the kind described, means for receiving a continuous stream of brick material, a cut-off, a conveyer for carrying the severed bricks away from said cut-off, said conveyer being connected for accelerated movement to separate the bricks, a retarding device to again bring the bricks together in separated bunches, and means for operating said parts in timed relation.

33. In an apparatus of the kind described, a brick stream supply, an off-bearing belt, a separating belt, and a subsequent conveyer belt, said belts having connection and arrangement for the off-bearing belt to move in time with the brick stream delivery, the separating belt at a substantially higher rate, and the subsequent conveyer belt at an intermediate rate.

34. In an apparatus of the kind described, a brick stream supply, an off-bearing belt, a separating belt, a retarding device coöperative therewith, and a subsequent conveyer belt, said parts having connection and arrangement for the off-bearing belt to move in time with the brick stream delivery, the separating belt at a substantially higher rate, the retarding device and the subsequent conveyer belt at an intermediate rate.

35. In an apparatus of the kind described, means for moving a stream of bricks forward into position for being loaded in units of a plurality of bricks each, carriers for carrying said bricks, and carrier distributing mechanism operated in unison with the forward movement of the bricks for delivering one carrier at a time as fast as a load of bricks gets in proper position for said carrier.

36. In an apparatus of the kind described, an off-bearing belt adapted to receive a continuous brick stream, a cut-off coöperative therewith, a brick separator, a retarding device having a path of movement adjacent said separator, connected for movement slower than said separator coöperative therewith to deliver the bricks therefrom in bunches, and a subsequent conveyer for receiving the bunches of bricks.

37. In an apparatus of the kind described, an off-bearing belt, a cut-off coöperative therewith, a separating belt, a retarding blade mounted on an endless carrier having a path of movement adjacent said separating belt, and a subsequent conveyer belt, said parts having connection and arrangement for the off-bearing belt to be moved in time with a brick stream supply, the separating belt at a substantially higher rate, and the retarding device and subsequent conveyer belt at an intermediate rate.

38. In an apparatus of the kind described, an off-bearing belt, a cut-off, a separating belt, a retarding device coöperative therewith, a subsequent conveyer belt, brick carrier clamps coöperative therewith, said parts being connected and arranged for the off-bearing belt to move in time with a brick stream supply, the separating belt at a higher rate, the subsequent conveyer belt and retarding device at an intermediate rate, and the carrier clamps in time with said subsequent conveyer belt.

39. In an apparatus of the kind described, continuously moving brick-delivery means for delivering bricks with a continuous forward movement in position to be loaded, a carrier for transporting said bricks, means adjacent the loading portion of said delivery means for positively moving said carrier at the same speed as the bricks, and coöperating automatic mechanism for securing a load of bricks on said carrier while the carrier and bricks are still moving.

40. In an apparatus of the kind described, means for receiving a continuous stream of bricks, means for forwarding the same in separated bunches, hacking clamps and means for delivering such bunches to said hacking clamps with a space interval between deliveries.

41. In an apparatus of the kind described, means for receiving a continuous stream of bricks, means for segregating bunches of bricks from such stream, and for delivering successive bunches to different stations for subsequent treatment.

42. In an apparatus of the kind described, means for receiving a continuous stream of bricks, means for forwarding the same in separated bunches, and means for delivering successive bunches to separated stations.

In testimony whereof, I have signed my name to this specification, in the presence of two subscribing witnesses.

RAYMOND C. PENFIELD.

Witnesses:

EARLE C. KENDRICK,

C. P. MERTENS.